(12) United States Patent
Fahey et al.

(10) Patent No.: US 11,629,095 B2
(45) Date of Patent: Apr. 18, 2023

(54) ETCHING GLASS AND GLASS CERAMIC MATERIALS IN HYDROXIDE CONTAINING MOLTEN SALT

(71) Applicant: CORNING INCORPORATED, Corning, NY (US)

(72) Inventors: Albert Joseph Fahey, Corning, NY (US); Yuhui Jin, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 280 days.

(21) Appl. No.: 16/886,297

(22) Filed: May 28, 2020

(65) Prior Publication Data

US 2020/0377406 A1 Dec. 3, 2020

Related U.S. Application Data

(60) Provisional application No. 62/855,327, filed on May 31, 2019.

(51) Int. Cl.
*C03C 15/00* (2006.01)
*C03C 21/00* (2006.01)

(52) U.S. Cl.
CPC ............ *C03C 15/00* (2013.01); *C03C 21/001* (2013.01)

(58) Field of Classification Search
CPC ..... C03C 15/00; C03C 21/001; C03C 21/002; C03C 3/083; C03C 3/085; C03C 3/087;
(Continued)

(56) References Cited

U.S. PATENT DOCUMENTS 1,189,741 A 7/1916 Rundloef
4,721,549 A 1/1988 Bogenschutz et al.
(Continued)

FOREIGN PATENT DOCUMENTS

CN 1656037 A * 8/2005 ............ C03C 15/02
CN 104016591 A 9/2014
(Continued)

OTHER PUBLICATIONS

International Search Report and Written Opinion of the International Searching Authority; PCT/US2020/034770; dated Oct. 1, 2020; 10 Pages; European Patent Office.
(Continued)

*Primary Examiner* — Duy Vu N Deo
(74) *Attorney, Agent, or Firm* — John P. McGroarty

(57) ABSTRACT

A method of etching a substrate comprises: contacting a substrate having a thickness with an etchant disposed in a vessel for a period of time until the thickness has reduced by at least 2 μm and at an average rate of 1 μm per minute to 6.7 μm per minute, the etchant having a temperature of 170° C. to 300° C. and comprising a molten mixture of two or more alkali hydroxides; and ceasing contacting the substrate with the etchant. The etchant in some instances comprises a molten mixture of NaOH and KOH. For example, the etchant in some instances includes a molten mixture of 24 wt. % to 72 wt. % NaOH, and 76 wt. % to 28 wt. % KOH. In some instances, the method alters the weight percentage of $Na^+$, $K^+$ and $Li^+$ in the composition of the surface of the substrate by less than 1%.

15 Claims, 13 Drawing Sheets

(58) Field of Classification Search
CPC ......... C03C 3/089; C03C 3/091; C03C 3/093; C03C 3/095; C09K 13/02
USPC .......................................................... 216/98
See application file for complete search history.

(56) References Cited

U.S. PATENT DOCUMENTS

| | | |
|---|---|---|
| 5,425,847 A | 6/1995 | Narukawa et al. |
| 9,140,543 B1 | 9/2015 | Allan et al. |
| 9,809,488 B2 | 11/2017 | Beall et al. |
| 2012/0045649 A1 | 2/2012 | Pieters |
| 2016/0102010 A1 | 4/2016 | Beall et al. |
| 2018/0086662 A1* | 3/2018 | Luzzato ................ C03C 15/00 |
| 2018/0141854 A1* | 5/2018 | Huang ................ C03C 21/005 |
| 2019/0100457 A1* | 4/2019 | Luzzato ................ C03C 15/00 |

FOREIGN PATENT DOCUMENTS

| | | |
|---|---|---|
| EP | 0587409 A2 | 3/1994 |
| JP | 02917480 B2 | 7/1999 |
| WO | 2010/139721 A1 | 12/2010 |
| WO | 2011056948 A2 | 5/2011 |

OTHER PUBLICATIONS

Zhuang et al; "Defect-Selective Etching of Bulk AlN Single Crystals in Molten KOH/NaOH Eutetic Alloy"; Journal of Crystal Growth; vol. 262, No. 1-4 (2004) pp. 89-94.

* cited by examiner

ETCHING GLASS AND GLASS CERAMIC MATERIALS IN HYDROXIDE CONTAINING MOLTEN SALT

This application claims the benefit of priority under 35 U.S.C. § 119 of U.S. Provisional Application Ser. No. 62/855,327 filed on May 31, 2019 the content of which is relied upon and incorporated herein by reference in its entirety.

FIELD

The present disclosure generally relates to methods of etching glass, glass-ceramic and ceramic articles with etchants that do not utilize hydrofluoric acid (HF) but, rather, a molten mixture of two or more of alkali hydroxides at elevated temperatures.

BACKGROUND

Glass, glass-ceramic, and ceramic substrates are utilized in consumer electronics for various purposes, such as to cover displays. In some instances, the substrates are prepared thicker than required for the particular application. Similarly, in some instances, the substrates are textured (such as via sandblasting) to impart surface features that improve tactile response or impart antiglare properties but additionally reduce the strength of the substrate. Heretofore, the thickness of the substrate has been reduced and the strength of the substrate rehabilitated by etching the substrate with hydrofluoric acid or a high pH aqueous hydroxide solution. However, etching the substrate with a high pH aqueous hydroxide solution is too slow for production quantities and requires relatively high temperatures, and etching the substrate with hydrofluoric acid might be environmentally suboptimal.

SUMMARY

The present disclosure solves that problem by etching the substrate with a eutectic molten mixture of alkali hydroxides having a temperature of 170° C. to 300° C. Etching the substrate with a eutectic molten mixture of alkali hydroxides avoids the use of hydrofluoric acid and is thus more environmentally optimal. In addition, etching the substrate with a eutectic molten mixture of alkali hydroxides is faster than etching with a high pH aqueous hydroxide solution and thus allows for the manufacture of production quantities in a commercially viable timeframe. Further, experiments have demonstrated that a eutectic molten mixture of alkali hydroxides maintains an ability to etch repeated substrates at approximately the same etching rate. Moreover, experiments have demonstrated that textured substrates etched with a eutectic molten mixture of alkali hydroxides are stronger than textured substrates etched with a high pH aqueous hydroxide solution, and have similar strength to non-textured substrates.

According to a first aspect of the present disclosure, a method of etching a substrate comprises: contacting a substrate having a thickness with an etchant disposed in a vessel for a period of time until the thickness has reduced by at least 2 µm and at an average rate of 1 µm per minute to 6.7 µm per minute, the etchant having a temperature of 170° C. to 300° C. and comprising a molten mixture of two or more alkali hydroxides; and ceasing contacting the substrate with the etchant.

According to a second aspect of the present disclosure, the method of the first aspect further comprises: before contacting the substrate with the etchant, increasing a texture of a surface of the substrate.

According to a third aspect of the present disclosure, the method of any of the first through second aspects further comprises: before contacting the substrate with the etchant, increasing a texture of a surface of the substrate.

According to a fourth aspect of the present disclosure, the method of the second aspect, wherein increasing the texture of the surface of the substrate comprises sandblasting the surface.

According to a fifth aspect of the present disclosure, the method of the third aspect, wherein tempering the substrate comprises subjecting the substrate to an ion-exchange procedure.

According to a sixth aspect of the present disclosure, the method of any one of the 1st through fifth aspects, wherein the etchant further comprises one or more of an alkali nitrate and an alkali sulfate.

According to a seventh aspect of the president disclosure, the method of the sixth aspect, wherein the alkali nitrate is one or more of $KNO_3$ and $NaNO_3$.

According to an eighth aspect of the present disclosure, the method of the sixth aspect, wherein the alkali sulfate is one or more of $K_2SO_4$ and $Na_2SO_4$.

According to a ninth aspect of the present disclosure, the method of the sixth aspect, wherein the one or more of the alkali nitrate and the alkali sulfate is greater than 0 wt. % to 95 wt. % of the etchant.

According to a tenth aspect of the present disclosure, the method of any one of the first through fifth aspects, wherein the etchant comprises a molten mixture of NaOH and KOH.

According to an eleventh aspect of the present disclosure, the method of any one of the first through fifth aspects, wherein the etchant comprises a molten mixture of 24 wt. % to 72 wt. % NaOH, and 76 wt. % to 28 wt. % KOH.

According to twelfth aspect of the present disclosure, the method of any one of the first through eleventh aspects, wherein the substrate is an alkali aluminosilicate glass substrate or an alkali aluminosilicate glass-ceramic substrate.

According to a thirteenth aspect of the present disclosure, the method of any one of the first through twelfth aspects, wherein the period of time is between 5 minutes and 2 hours.

According to a fourteenth aspect of the present disclosure, the method of any one of the first through thirteenth aspects, wherein the substrate has a composition; and the method alters a weight percentage of any one or more of $Na^+$, $K^+$, $Li^+$ in the composition from a surface to a depth of 1 µm into the thickness by less than 5%.

According to a fifteenth aspect of the present disclosure, the method of any one of the first through thirteenth aspects, wherein the substrate has a composition; and the method alters a weight percentage of any one or more of $Na^+$, $K^+$, $Li^+$ in the composition from a surface to a depth of 1 µm into the thickness by less than 1%.

According to a sixteenth aspect of the present disclosure, the method of any one of the first through fifteenth aspects, wherein the substrate has a composition; and the method alters a weight percentage of any one or more of $Ca^{++}$, $Mg^{++}$ in the composition from a surface to a depth of 1 µm into the thickness by less than 5%.

According to a seventeenth aspect of the present disclosure, the method of any one of the first through fifteenth aspects, wherein the substrate has a composition; and the method alters a weight percentage of any one or more of $Ca^{++}$, $Mg^{++}$ in the composition from a surface to a depth of 1 μm into the thickness by less than 1%.

According to an eighteenth aspect of the present disclosure, the method of the first aspect, wherein the substrate is one of a plurality of substrates, each having a thickness, and, the method further comprises: maintaining the etchant disposed in the vessel; and for each remaining substrate of the plurality of substrates sequentially: (a) contacting the substrate with the etchant disposed in the vessel for a period of time until the thickness has reduced by at least 2 μm and at an average rate of 1 μm per minute to 6.7 μm per minute; and (b) ceasing contacting the substrate with the etchant.

According to a nineteenth aspect of the present disclosure, the method of the eighteenth aspect, wherein the plurality of substrates numbers at least 10 substrates.

According to a twentieth aspect of the present disclosure, the method of any one of the eighteenth through nineteenth aspects, wherein each of the plurality of substrates was formed from the same batch composition.

According to a twenty-first aspect of the present disclosure, the method of any one of the eighteenth through twentieth aspects further comprising: before contacting each remaining substrate of the plurality of substrates, increasing a texture of a surface of each remaining substrate of the plurality of substrates.

According to a twenty-second aspect of the present disclosure, the method of any one of the eighteenth through twenty-first aspects further comprising: tempering each remaining substrate of the plurality of substrates via an ion-exchange procedure.

According to a twenty-third aspect of the present disclosure, a system to reduce the thickness of a substrate comprises: (a) a vessel; (b) an etchant disposed in the vessel, the etchant contacting a surface of the vessel, the etchant comprising a molten mixture of two or more alkali hydroxides, and the etchant having a temperature of 170° C. to 300° C.; and a substrate having a first position where the substrate does not contact the etchant, a second position where the substrate contacts the etchant, a third position where the substrate again does not contact the etchant, and a thickness that is at least 2 μm greater in the first position than in the third position and that decreases while in the second position at a rate of 1 μm per minute to 6.7 μm per minute.

According to a twenty-fourth aspect of the present disclosure, the twenty-third aspect, wherein the surface of the vessel that contacts the etchant is polytetrafluoroethylene.

According to a twenty-fifth aspect of the present disclosure, the twenty-third aspect, wherein the surface of the vessel that contacts the etchant is nickel.

According to a twenty-sixth aspect of the present disclosure, any one of the twenty-third through twenty-fifth aspects, wherein the etchant comprises a molten mixture of NaOH and KOH.

According to a twenty-seventh aspect of the present disclosure, any one of the twenty-third through twenty-fifth aspects, wherein the etchant comprises a molten mixture of 24 wt. % to 72 wt. % NaOH, and 76 wt. % to 28 wt. % KOH.

According to a twenty-eighth aspect of the present disclosure, any one of the twenty-third through twenty-seventh aspects, wherein the substrate is an alkali aluminosilicate glass substrate or an alkali aluminosilicate glass-ceramic substrate.

According to a twenty-ninth aspect of the president disclosure, the system of any one of the twenty-third through twenty-eighth aspects further comprising: a heating element in communication with the etchant.

According to a thirtieth aspect of the present disclosure, any one of the twenty-third through twenty-ninth aspects, wherein the substrate has regions under compressive stress.

According to a thirty-first aspect of the present disclosure, any one of the twenty-third through thirtieth aspects, where in the thickness of the substrate in the third position is at least 20 μm less than the thickness of the substrate in the first position.

According to a thirty-second aspect of the present disclosure, any one of the twenty-third through thirty-first aspects, wherein the substrate is in the second position for a period of time of 10 minutes to 30 minutes.

According to a thirty-third aspect of the present disclosure, any one of the twenty-third through thirty-second aspects, wherein the etchant further comprises one or more of an alkali nitrate and an alkali sulfate.

According to a thirty-fourth aspect of the present disclosure, any one of the twenty-third through thirty-third aspects, wherein the substrate further comprises a composition and a first surface that contacts the etchant in the second position of the substrate, and a weight percentage of any one or more of $Na^+$, $K^+$, $Li^+$ in the composition of the substrate from the first surface to a depth of 1 μm into the thickness when the substrate is in the third position is ±5% of the weight percentage of the any one or more of $Na^+$, $K^+$, $Li^+$ in the composition of the substrate from the first surface to a depth of 1 μm into the thickness when the substrate is in the first position.

According to a thirty-fifth aspect of the present disclosure, any one of the twenty-third through thirty-third aspects, wherein the substrate further comprises a composition and a first surface that contacts the etchant in the second position of the substrate, and a weight percentage of any one or more of $Ca^{++}$, $Mg^{++}$ in the composition of the substrate from the first surface to a depth of 1 μm into the thickness when the substrate is in the third position is ±5% of the weight percentage of the any one or more of $Ca^{++}$, $Mg^{++}$ in the composition of the substrate from the first surface to a depth of 1 μm into the thickness when the substrate is in the first position.

According to a thirty-sixth aspect of the present disclosure, the system of the twenty-third aspect further comprises: a plurality of substrates comprising the substrate, each of the plurality of substrates having the first position where the substrate does not contact the etchant, the second position where the substrate contacts the etchant, the third position where the substrate again does not contact the etchant, and the thickness that is greater in the first position than in the third position and that decreases while in the second position at a rate of 1 μm per minute to 6.7 μm per minute.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
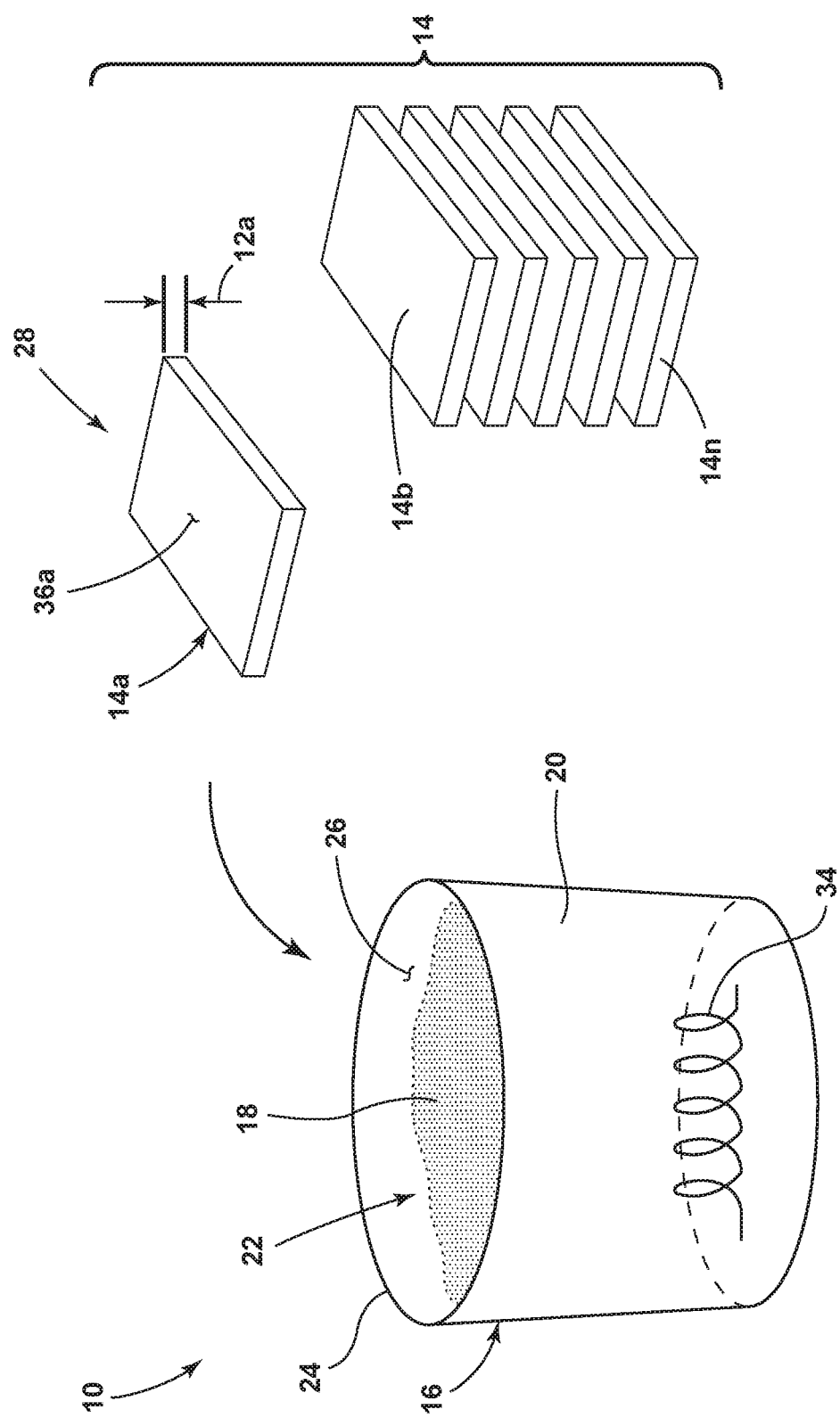
FIG. 1 is a schematic drawing of a system including a vessel containing an etchant and a substrate of a plurality of substrates having a thickness and in a first position not contacting the etchant.
Figure 2:
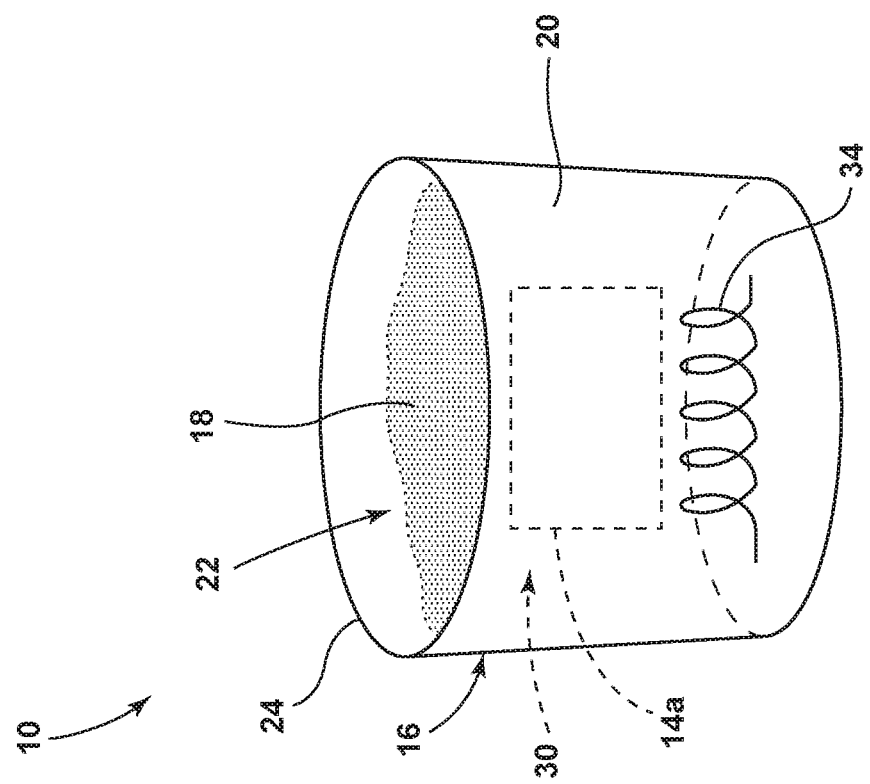
FIG. 2 is a perspective view of the vessel of FIG. 1 containing the etchant illustrating the substrate in a second position contacting the etchant, which reduces the thickness of the substrate.
Figure 3:
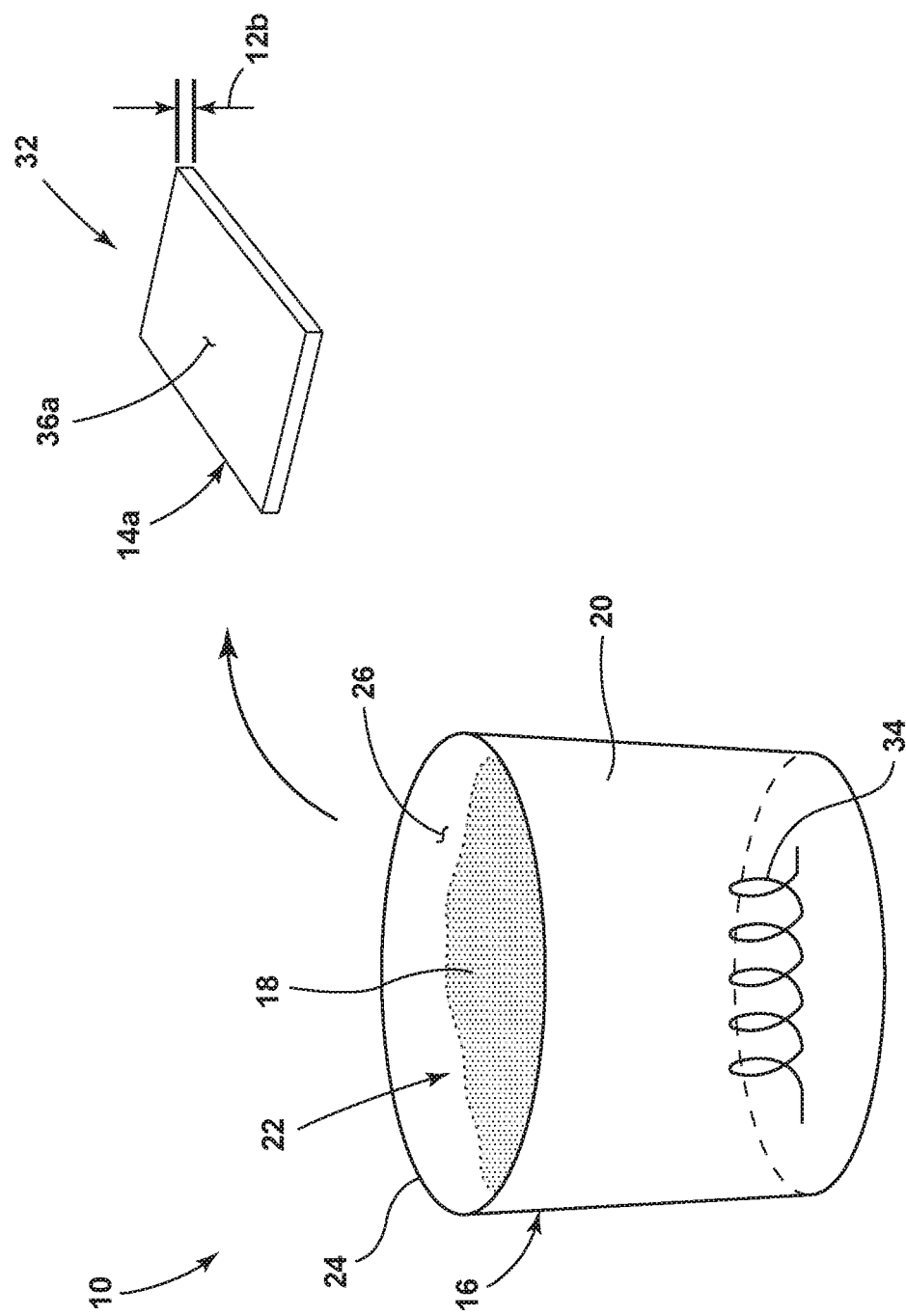
FIG. 3 is a schematic drawing of the system of FIG. 1, illustrating the substrate in a third position no longer contacting the etchant, and the thickness of the substrate in the third position having decreased relative to the thickness of the substrate in the first position because the etchant removed a portion of the substrate.
Figure 4:
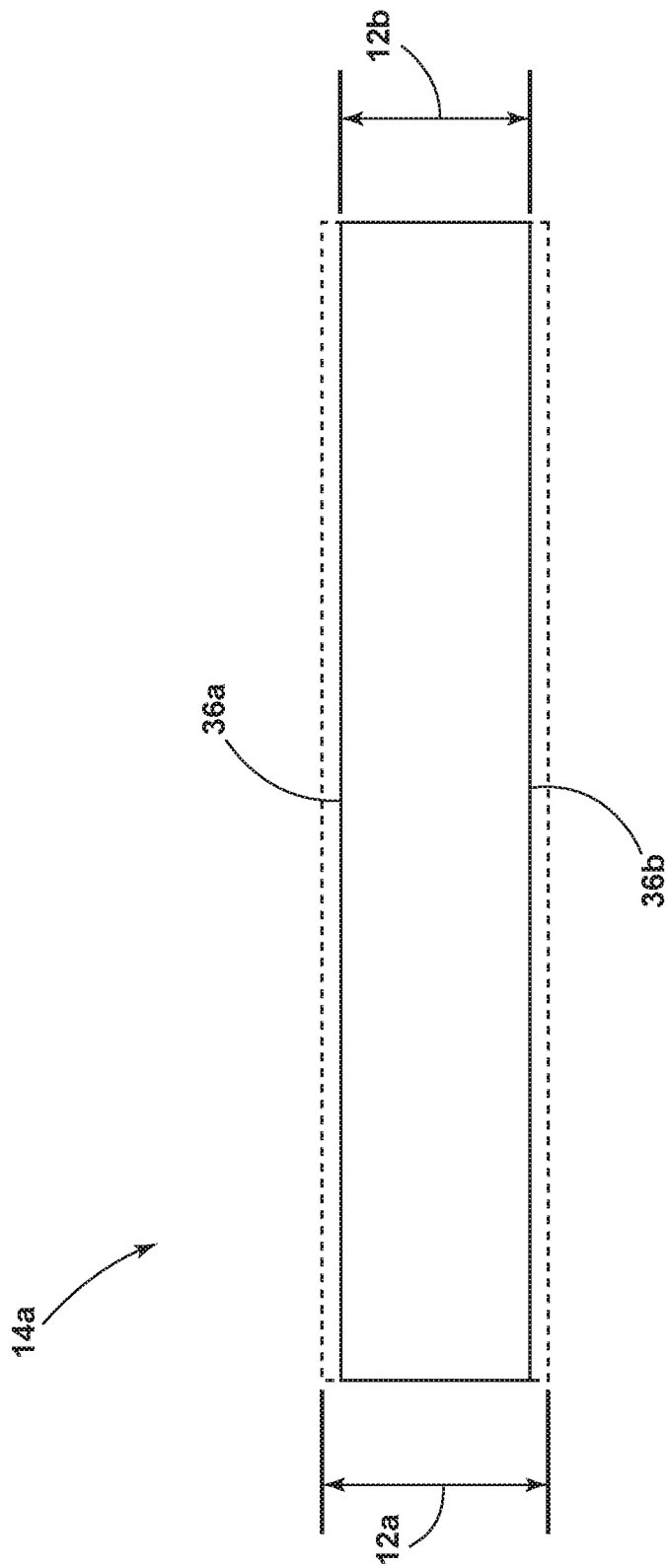
FIG. 4 is an elevational view of the substrate of the system of FIG. 1, illustrating the thickness in the third position after contacting the etchant, and, in phantom, the thicker thickness that the substrate had in the first position before contacting the etchant.
Figure 5:
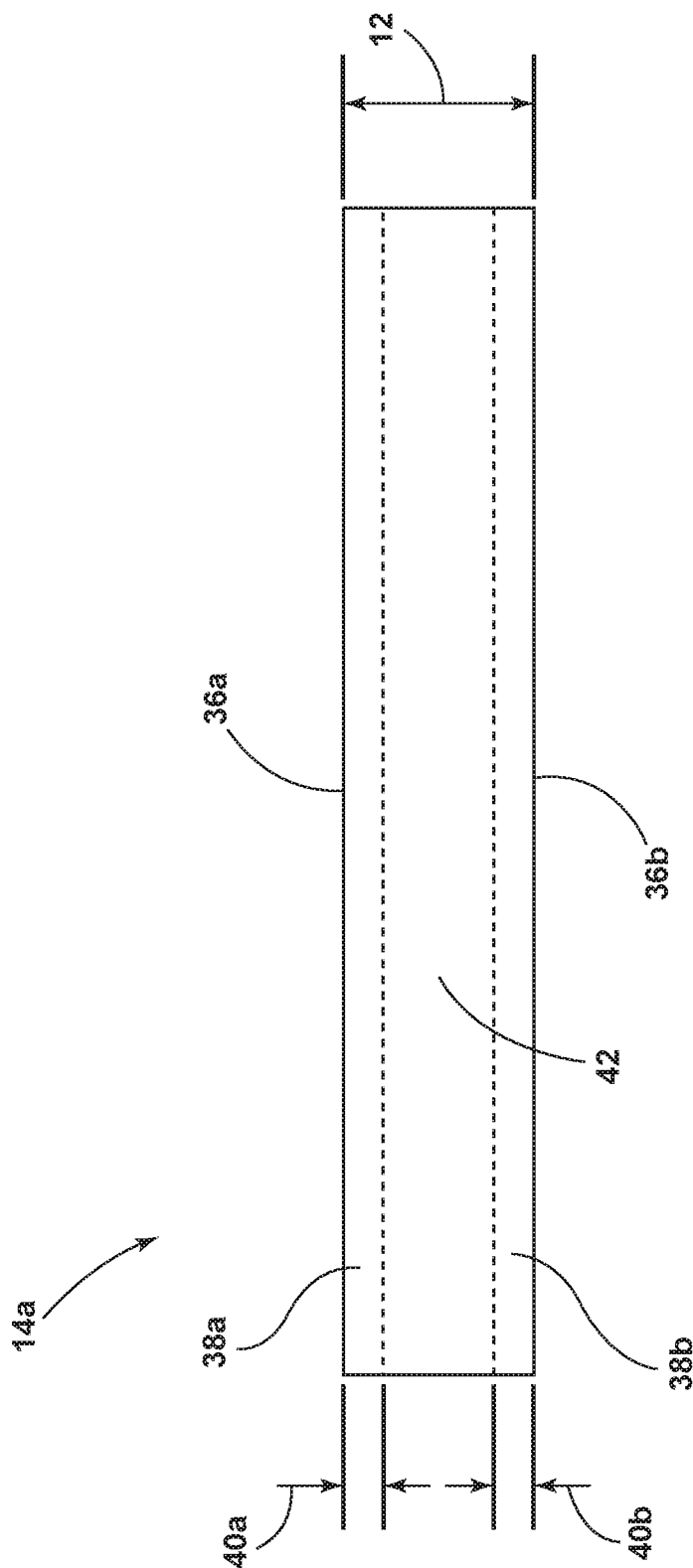
FIG. 5 is an elevational view of the substrate of the system of FIG. 1, illustrating the substrate having regions of compressive stress contiguous with a first surface and a second surface and a tensile stress region between the regions of compressive stress, the regions of compressive and tensile stress added pursuant to a tempering step of a method disclosed herein.

Reference will now be made in detail to the present preferred embodiments, examples of which are illustrated in the accompanying drawings. Whenever possible, the same reference numerals will be used throughout the drawings to refer to the same or like parts.

I. SYSTEM TO REDUCE SUBSTRATE THICKNESS

Referring now to FIGS. 1-5, a system 10 to reduce a thickness 12 of a substrate 14a is illustrated. The system 10 includes a vessel 16, an etchant 18, and the substrate 14a. The vessel 16 includes at least one side wall 20 forming a cavity 22 and an opening 24 into the cavity 22. The vessel 16 has a surface 26 open to the cavity 22, such as at the at least one side wall 20. The etchant 18 is disposed in the cavity 22 of the vessel 16. The surface 26 of the vessel 16 thus contacts the etchant 18 disposed within the vessel 16. The substrate 14a has a first position 28 (FIG. 1), a second position 30 (FIG. 2), and a third position 32 (FIG. 3) in relation to the etchant 18. In the first position 28 (FIG. 1), the substrate 14a does not contact the etchant 18. In the second position 30 (FIG. 2), the substrate 14a contacts the etchant 18. In embodiments, the substrate 14a contacts the etchant 18 via immersing, submersing, dipping, or otherwise placing part or the entirety of the substrate 14a in the etchant 18 disposed within the vessel 16. In the third position 32 (FIG. 3), the substrate 14a again does not contact the etchant 18. However, the substrate 14a has a thickness 12, including a thickness 12a in the first position 28 that is at least 2 µm greater than a thickness 12b in the third position 32. The thickness 12 of the substrate 14a decreases from the thickness 12a to the thickness 12b while in the second position 30 at a rate of 1 µm per minute to 6.7 µm per minute.

The etchant 18 includes a molten mixture of two or more alkali hydroxides. In embodiments, the etchant 18 is or comprises a eutectic molten mixture of two alkali hydroxides. In embodiments, the etchant 18 is or comprises a eutectic molten mixture of NaOH and potassium hydroxide (KOH). A mixture of molten NaOH and KOH is eutectic, allowing the mixture to be entirely molten at a temperature below the temperature at which pure NaOH or pure KOH would be molten. For example, a mixture of 43.1 wt. % NaOH and 56.9 wt. % KOH becomes entirely molten above 174.5° C., while pure KOH becomes molten at a temperature above 400° C. and pure NaOH at a temperature above 300° C. Suitable mixtures include from 24 wt. % to 72 wt. % NaOH, with the balance (76 wt. % to 28 wt. %) KOH. As a molten mixture, no water is purposefully included.

The etchant 18, as containing alkali hydroxides, can be corrosive to the surface 26 of the vessel 16. The level of corrosiveness depends on the composition of the surface 26 of the vessel 16 and the temperature of the etchant 18. In embodiments, the surface 26 is polytetrafluoroethylene (e.g., Teflon, distributed by The Chemours Company, Wilmington, Del., USA). At temperatures below 250° C., molten sodium hydroxide (NaOH) (an alkali hydroxide) does not pose a significant corrosion risk to polytetrafluoroethylene. Thus, in embodiments, the etchant 18 is or comprises a molten mixture of NaOH and at least one other alkali hydroxide, the surface 26 of the vessel 16 is polytetrafluoroethylene, and the temperature of the etchant 18 is below 250° C.

In other embodiments, the surface 26 is or comprises nickel. At temperatures below 300° C., molten sodium hydroxide (NaOH) does not pose a significant corrosion risk to nickel. Thus, in embodiments, the etchant 18 is or comprises a molten mixture of NaOH and at least one other alkali hydroxide, the surface 26 of the vessel 16 is or comprises nickel, and the temperature of the etchant 18 is below 300° C.

In embodiments, the etchant 18 has a temperature of 170° C. to 300° C., such as 170° C. to 250° C. Exceeding the upper bound of 300° C. has the potential to damage the surface 26 of the vessel 16, as explained above, even if the surface 26 is or comprises nickel. Exceeding the upper bound of 250° C. has the potential to damage the surface 26 of the vessel 16, even when the surface 26 is or comprises polytetrafluoroethylene. In addition, as further discussed below, for substrates 14a of some compositions, when the temperature of the etchant 18 exceeds 300° C. or 250° C., the etchant 18 etches the substrate 14a too quickly to adequately control. When the etchant 18 has a temperature below the lower bound of 170° C., the temperature may be insufficient to maintain the mixture of alkali hydroxides as molten, and the etchant 18 would etch the substrate 14a too slowly to be commercially practicable, which was one of the problems the present disclosure intends to solve.

In embodiments, the system 10 further comprises a heating element 34. The heating element 34 is in communication with the etchant 18. The heating element 34 raises the temperature of the etchant 18 to the desired temperature of 170° C. to 300° C. and maintains the etchant 18 at the temperature.

In embodiments, the substrate 14a is a sheet with two primary surfaces—a first surface 36a and a second surface 36b—that face in generally opposite directions and are generally coplanar. The thickness 12 is the straight-line distance between the first surface 36a and the second surface 36b. In embodiments, the thickness 12a before contacting the substrate 14a with the etchant 18 is less than 5 mm. In embodiments, the thickness 12a is within the ranges of 250 µm to 5 mm, 250 µm to 3 mm, 250 µm to 1 mm, or 500 µm to 1 mm. In embodiments, the thickness 12b of the substrate 14a in the third position 32 is at least 2 µm less than the thickness 12a in the first position 28. In other embodiments, the thickness 12b in the third position 32 is at least 10 µm, or at least 20 µm, or at least 50 µm, or at least 100 µm, or at least 200 µm less, or at least 300 µm less than the thickness 12a in the first position 28. In other embodiments, the thickness 12b in the third position 32 is 98.5% or less (or 94% or less, or 60% or less) of the thickness 12a in the first position 28. In other embodiments, the thickness 12b in the third position 32 is between 50% and 98.5% of the thickness 12a in the first position 28.

The thickness 12a of the substrate 14a in the first position 28 (i.e., before contacting the etchant 18) can be measured with a micrometer. To determine the thickness 12b in the third position 32 (i.e., after step 46 of contacting the etchant 18), the mass of the substrate 14a in the first position 28 is compared with the mass of the substrate 14a in the third position 32. The reduction in thickness 12 of the substrate 14a during step 46 is proportional to the decrease in mass of the substrate 14a during step 46. For example, if the thickness 12a of the substrate 14a in the first position 28 was 1 mm ("initial thickness"), and the mass of the substrate 14a in the first position 28 was 10 grams ("initial mass"), and the mass of the substrate 14a in the third position 32 is 9 grams ("final mass"), then the decrease in thickness 12 ("Δthickness") during the step 46 is calculated to be 100 µm (0.1 mm) from the equation (1) below:

$$\Delta\text{thickness} = \text{initial thickness} * \frac{\text{initial mass} - \text{final mass}}{\text{initial mass}}$$

The thickness 12b of the substrate 14b in the third position 32 ("final thickness") is calculated to be 0.9 mm from the equation (2) below:

$$\text{final thickness} = \text{initial thickness} - \Delta\text{thickness}$$

The rate of decrease of the thickness 12 during step 46 ("etch rate") is calculated, pursuant to equation (3) below, as:

$$\text{etch rate} = \frac{\Delta\text{thickness}}{\text{etch time}}$$

Thus, continuing the example, if the etch time of step 46 was 1 hour then the etch rate was 0.1 mm/1 hr=0.1 mm/hr or 100 µm/hr. Step 46 can result in variations of thickness 12b of the substrate 14a. Accordingly, calculating the thickness 12b of the substrate 14a in the third position 32 after step 46 as a function in the change in mass of the substrate 14a provides a more accurate determination of the thickness 12b in the third position 32. The greater the surface area of the first surface 36a and the second surface 36b contacting the etchant 18 compared to non-primary surfaces contacting the etchant 18 (such as exposed side surfaces), the greater the accuracy of the determination of the thickness 12b from using the measured change in mass of the substrate 14.

As mentioned, the rate at which the etchant 18 decreases the thickness 12 of the substrate 14a while in the second position 30 contacting the etchant 18 is controlled to be 1 µm per minute to 6.7 µm per minute (i.e., 60 µm per hour to 400 µm per hour). The rate at which the etchant 18 decreases the thickness 12 of the substrate 14a is a function of the temperature of the etchant 18—the higher the temperature, the faster the rate. This concept is further elaborated upon below. In embodiments, the rate of 1 µm per minute to 6.7 µm per minute is the average rate for the total period of time that the substrate 14a is contacting the etchant 18 in the second position 30. In embodiments, the rate of 1 µm per minute to 6.7 µm per minute applies when the substrate 14a is sheet-like with the first surface 36a and the second surface 36b, and both the first surface 36a and the second surface 36b are contacting the etchant 18 in the second position 30.

In embodiments, a film covers either the first surface 36a or the second surface 36b rendering the covered first surface 36a or second surface 36b unavailable to contact the etchant 18 while in the second position 30. In such embodiments, the rate at which the etchant 18 reduces the thickness 12 of the substrate 14a is 0.5 µm per minute to 3.35 µm per minute (i.e., 30 µm per hour to 200 µm per hour).

Above the rate of 6.7 µm per minute, then the etchant 18 is reducing the thickness 12 of the substrate 14a too quickly to ensure that the thickness 12b of the substrate 14a in the third position 32 is within acceptable tolerances. The rate of 1.0 µm per minute when both surfaces 36a, 36b of the substrate 14a are contacting the etchant 18 (or the rate of 0.5 µm when only one of the surfaces 36a, 36b are contacting the etchant 18) ensures migration from the etchant 18 (e.g., ion-exchange) is not substantially altering the composition of the substrate 14a at the contacted surfaces 36a, 36b. In other words, if the etching rate were below 1 µm per minute (or 0.5 µm per minute, as the case may be), then ion-exchange between the etchant 18 and the substrate 14a can substantially alter the composition of the substrate 14a at the surfaces contacting the etchant 18. The etchant 18 includes alkali ions. The substrate 14a in embodiments includes alkali ions (e.g., $Na^+$, $K^+$, $Li^+$) and/or alkaline earth ions (e.g., $Mg^{++}$, $Ca^{++}$). In the second position 30, the surfaces 36a, 36b of the substrate 14a contacting the etchant 18 at any given point in time is being etched away faster than ions can migrate into or out of the substrate 14a. If this were not the case, and the composition of the substrate 14a at the exposed surfaces 36a, 36b could be substantially altered, it would detrimentally affect potential subsequent chemical tempering of the substrate 14a. Further, substantial alteration of the composition of the substrate 14a at the exposed surfaces 36a, 36b can result in warpage of the substrate 14a.

In embodiments, the first surface 36a of the substrate 14a contacts the etchant 18 in the second position 30 of the substrate 14a, and the composition of the substrate 14a from the first surface 36a to a depth of 1 µm into the thickness 12 at the first position 28 and the third position 32 are substantially the same. In embodiments, the second surface 36b of the substrate 14a contacts the etchant 18 in the second position 30 of the substrate 14a, and the composition of the substrate 14a from the second surface 36b to a depth of 1 µm into the thickness 12 at the first position 28 and the third position 32 are substantially the same.

In embodiments, the first surface 36a of the substrate 14a contacts the etchant 18 in the second position 30 of the substrate 14a, and the weight percentage of any one or more of $Na^+$, $K^+$, $Li^+$ in the composition of the substrate 14a from the first surface 36a to a depth of 1 µm into the thickness 12b when the substrate 14a is in the third position 32 is ±5% of the weight percentage of the any one or more of $Na^+$, $K^+$, $Li^+$ in the composition of the substrate 14a from the first surface 36a to a depth of 1 µm into the thickness 12a when the substrate 14a is in the first position 28. For example, assume that, in the first position 28 of the substrate 14a, the concentration of $Li^+$ in the composition of the substrate 14a from the first surface 36a to a depth of 1 µm into the thickness 12a is 1.5 wt. % of the composition of the substrate 14a. Then, in the third position 32 of the substrate 14a, the concentration of $Li^+$ in the composition of the substrate 14a from the first surface 36a to a depth of 1 µm into the thickness 12b is no more than 1.575 wt. % (1.05*1.5) and no less than 1.425 wt. % (0.95*1.5). In embodiments, the first surface 36a of the substrate 14a contacts the etchant 18 in the second position 30 of the substrate 14a, and the weight percentage of any one or more of $Na^+$, $K^+$, $Li^+$ in the composition of the substrate 14a from the first surface 36a to a depth of 1 µm into the thickness 12b when the substrate 14a is in the third position 32 is ±1% of the weight percentage of the any one or more of $Na^+$, $K^+$, $Li^+$ in the composition of the substrate 14a from the first surface 36a to a depth of 1 µm into the thickness 12a when the substrate 14a is in the first position 28.

In embodiments, the first surface 36a of the substrate 14a contacts the etchant 18 in the second position 30 of the substrate 14a, and the weight percentage of any one or more of $Ca^{++}$, $Mg^{++}$ in the composition of the substrate 14a from the first surface 36a to a depth of 1 µm into the thickness 12b when the substrate 14a is in the third position 32 is ±5% of the weight percentage of the any one or more of $Ca^{++}$, $Mg^{++}$ in the composition of the substrate 14a from the first surface 36a to a depth of 1 µm into the thickness 12a when the substrate 14a is in the first position 28. For example, assume that, in the first position 28 of the substrate 14a, the concentration of $Ca^{++}$ in the composition of the substrate 14a from the first surface 36a to a depth of 1 µm into the thickness 12a is 1.5 wt. % of the composition of the substrate 14a. Then, in the third position 32 of the substrate 14a, the concentration of $Ca^{++}$ in the composition of the substrate 14a from the first surface 36a to a depth of 1 µm into the thickness 12b is no more than 1.575 wt. % (1.05*1.5) and no less than 1.425 wt. % (0.95*1.5). In embodiments, the first surface 36a of the substrate 14a contacts the etchant 18 in the second position 30 of the substrate 14a, and the weight percentage of any one or more of $Ca^{++}$, $Mg^{++}$ in the composition of the substrate 14a from the first surface 36a to a depth of 1 µm into the thickness 12b when the substrate 14a is in the third position 32 is ±1% of the weight percentage of the any one or more of $Ca^{++}$, $Mg^{++}$ in the composition of the substrate 14a from the first surface 36a to a depth of 1 µm into the thickness 12a when the substrate 14a is in the first position 28.

Depending on the desired thickness 12b for the substrate 14a in the third position 32, the temperature of the etchant 18, and the composition of the substrate 14a, the substrate 14a contacts the etchant 18 while in the second position 30 for a period of time of 5 minutes to 2 hours. In embodiments, the substrate 14a is in the second position 30 contacting the etchant 18 for a period of time of 10 minutes to 30 minutes.

The substrate 14a can be a glass substrate or a glass-ceramic substrate. The glass substrate or glass-ceramic substrate can have a composition of soda lime glass or glass-ceramic, alkali aluminosilicate glass or glass-ceramic, alkali containing borosilicate glass or glass-ceramic, and alkali aluminoborosilicate glass or glass-ceramic, although other glass compositions are contemplated. In embodiments, the substrate 14a is an alkali aluminosilicate glass substrate or an alkali aluminosilicate glass-ceramic substrate. Such glass or glass-ceramic compositions are capable of being chemically strengthened by an ion-exchange process. In some variants, the composition may be free of lithium ions. The substrate 14a can be formed using various methods, such as float glass processes and down-draw processes, such as fusion draw and slot draw.

In embodiments, the substrate 14a has been tempered (i.e., strengthened) to have a region 38a contiguous with the first surface 36a and a region 38b contiguous with the second surface 36b that is under compressive stress ("CS"). Contacting the substrate 14a with the etchant 18 while in the second position 30 can be useful to remove surface defects that were generated while creating the regions 38a, 38b under compressive stress (such as via ion-exchange) and, thereby, further increase the strength of the substrate 14a. The region(s) 38a, 38b under compressive stress extend from the first surface 36a and/or the second surface 36b, respectively, to a depth(s) of compression 40a, 40b, respectively. The generation of compressive stress further creates a central region 42 that is under a tensile stress, having a maximum value at the center of the central region 42, referred to as central tension or center tension (CT). The central region 42 extends between the depths of compression 40a, 40b and is under tensile stress. The tensile stress of the central region 42 balances the compressive stresses of the regions 38a, 38b under compressive stress. As used herein, the terms "depth of compression" and "DOC" refer to the depth at which the stress within the substrate 14a changes from compressive to tensile stress. At the depths of compression 40a, 40b, the stress crosses from a positive (compressive) stress to a negative (tensile) stress and thus has a value of zero. In embodiments, the depths of compression 40a, 40b are each at least 20 µm. In embodiments, the absolute value of the maximum compressive stress CS within the regions 38a, 38b is at least 200 MPa, at least about 400 MPa, at least 600 MPa, or up to about 1000 MPa.

Two methods for extracting detailed and precise stress profiles (stress as a function of depth) for a substrate 14a with regions 38a, 38b under compressive stress are disclosed in U.S. Pat. No. 9,140,543, entitled "Systems and Methods for Measuring the Stress Profile of Ion-Exchanged Glass," filed by Douglas Clippinger Allan et al. on May 3, 2012, and claiming priority to U.S. Provisional Patent Application No. 61/489,800, having the same title, and filed on May 25, 2011, the contents of which are incorporated herein by reference in their entirety.

An alkali aluminosilicate glass composition suitable for the substrate 14a comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $(Al_2O_3+B_2O_3)/\Sigma_{modifiers}$ (i.e., sum of modifiers) is greater than 1, wherein the ratio of the components are expressed in mol. % and the modifiers are alkali metal oxides. This composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $(Al_2O_3+B_2O_3)/\Sigma_{modifiers}$ (i.e., sum of modifiers) is greater than 1.

Another suitable alkali aluminosilicate glass composition for the substrate 14a comprises: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$SiO_2$+$B_2O_3$+CaO≤69 mol. %; $Na_2O$+$K_2O$+$B_2O_3$+MgO+CaO+SrO>10 mol. %; 5 mol. %≤MgO+CaO+SrO≤8 mol. %; ($Na_2O$+$B_2O_3$)–$Al_2O_3$≤2 mol. %; 2 mol. %<$Na_2O$–$Al_2O_3$≤6 mol. %; and 4 mol. %≤($Na_2O$+$K_2O$)–$Al_2O_3$≤10 mol. %.

Another suitable alkali aluminosilicate glass composition for the substrate 14a comprises: 2 mol. % or more of $Al_2O_3$ and/or $ZrO_2$, or 4 mol. % or more of $Al_2O_3$ and/or $ZrO_2$.

One example glass composition comprises $SiO_2$, $B_2O_3$, and $Na_2O$, where $(SiO_2+B_2O_3)≥66$ mol. %, and $Na_2O≥9$ mol. %. In an embodiment, the composition includes at least 6 wt. % aluminum oxide. In a further embodiment, the composition of one or more alkaline earth oxides, such as a content of alkaline earth oxides, is at least 5 wt. %. Suitable compositions, in some embodiments, further comprise at least one of $K_2O$, MgO, and CaO. In a particular embodiment, the composition of the substrate 14a comprises 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example composition suitable for the substrate 14a comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % ZrO2; 0-1 mol. % $SnO_2$; 0-1 mol. % $CeO_2$; less than 50 ppm $As_2O_3$; and less than 50 ppm $Sb_2O_3$; where 12 mol. %≤($Li_2O$+$Na_2O$+$K_2O$)≤0 mol. % and 0 mol. % MgO+CaO) ≤10 mol. %.

A still further example glass composition suitable for the substrate 14a comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. %≤($Li_2O$+$Na_2O$+$K_2O$)≤18 mol. % and 2 mol. %≤(MgO+CaO)≤7 mol. %.

The substrate 14a can be a cerammed version of the above described glass compositions. The substrate 14a can be an alkali aluminosilicate glass-ceramic, among other options. In embodiments, the substrate 14a is a glass-ceramic described in U.S. Pat. No. 9,809,488 and 10,189,741, and U.S. Patent Application Publication No. 2016/0102010A1, which are all hereby incorporated herein by reference in their entirety. An example glass-ceramic suitable for the substrate 14a comprises (in wt. %): $SiO_2$: 55-80%; $Al_2O_3$: 2-20%; $Li_2O$: 5-20%; $B_2O_3$: 0-10%; $Na_2O$: 0-5%; ZnO: 0-10%; $P_2O_5$: 0.5-6%; and $ZrO_2$: 0.2-15%. That composition can include the following optional additional components (in wt. %): $K_2O$: 0-4%; MgO: 0-8%; $TiO_2$: 0-5%; $CeO_2$: 0-0.4% and $SnO_2$: 0.05-0.5%. Another example glass-ceramic suitable for the substrate 14a comprises (in wt. %): $SiO_2$: 69-80%; $Al_2O_3$: 6-9%; $Li_2O$: 10-14%; $B_2O_3$: 0-2%; $P_2O_5$: 1.5-2.5%; and $ZrO_2$: 2-4%. Another example glass-ceramic suitable for the substrate 14a comprises (in wt. %): $SiO_2$: 69-80%; $Al_2O_3$: 6-9%; $Li_2O$: 10-14%; $Na_2O$: 1-2%; $K_2O$: 1-2%; $B_2O_3$: 0-12%; $P_2O_5$: 1.5-2.5%; and $ZrO_2$: 2-4%. Another example glass-ceramic suitable for the substrate 14a comprises (in wt. %): $SiO_2$: 65-80%; $Al_2O_3$: 5-16%; $Li_2O$: 8-15%; $Na_2O$: 0-3%; $K_2O$: 0-3%; $B_2O_3$: 0-6%; ZnO: 0-2%; $P_2O_5$: 0.5-4%; and $ZrO_2$: 0.2-6%. Another example glass-ceramic suitable for the substrate 14a comprises (in wt. %): $SiO_2$: 60-80%; $Al_2O_3$: 5-20%; $Li_2O$: 5-20%; $Na_2O$: 0-3%; $K_2O$: 0-3%; $B_2O_3$: 0-6%; ZnO: 0-4%; $P_2O_5$: 0.5-4%; and $ZrO_2$: 0.2-8%. In some embodiments, a sum of the weight percentage of $P_2O_5$ and $ZrO_2$ in the glass-ceramic composition of the substrate 14a is greater than 3. In some embodiments, the glass-ceramic has a petalite crystalline phase and a lithium silicate crystalline phase.

In embodiments, the etchant 18 further comprises one or more of an alkali nitrate and an alkali sulfate. For example, the alkali nitrate can be one or more of $KNO_3$ and $NaNO_3$, and the alkali sulfate can be one or more of $K_2SO_4$ and $Na_2SO_4$. The one or more of an alkali nitrate and an alkali sulfate, if included in the etchant 18, can be between 0 wt. % to 95 wt. % of the etchant 18. The inclusion of the one or more of an alkali nitrate and an alkali sulfate helps control the rate at which the etchant 18 reduces the thickness 12 of the substrate 14a to be within the bounds of 1 µm per minute to 6.7 µm per minute, if the composition of the substrate 14a is such that contact with a pure molten mixture of two or more alkali hydroxides would reduce the thickness 12 of the substrate 14a too quickly.

In embodiments, the system 10 further comprises a plurality of substrates 14a, 14b, . . . 14n, of which the substrate 14a is one. Each of the plurality of substrates 14a, 14b, . . . 14n has the first position 28 where the substrate 14a, 14b, . . . 14n does not contact the etchant 18, the second position 30 where the substrate 14a, 14b, . . . 14n contacts the etchant 18, and the third position 32 where the substrate 14a, 14b, . . . 14n again does not contact the etchant 18. Each of the plurality of substrates 14a, 14b, . . . 14n has the thickness 12a in the first position 28 that is at least 2 µm greater than the thickness 12b in the third position 32. The thickness 12 of each of the plurality of substrates 14a, 14b, . . . 14n decreases while in the second position 30 at a rate of 1 μm to 6.7 μm. The etchant 18 of the system 10 remains the same for all the plurality of substrates 14a, 14b, . . . 14n and the same etchant 18 reduces the thickness 12 of all the plurality of substrates 14a, 14b, . . . 14n without being exchanged for a new etchant 18. The etchant 18 comprising the molten mixture of two or more alkali hydroxides remains effective for etching for a surprising number of cycles. In other words, the etchant 18 is capable of successively etching all of the plurality of substrates 14a, 14b, . . . 14n at approximately the same rate. In other words, the etching power of the etchant 18 does not appear to decay quickly. In embodiments, the plurality of substrates 14a, 14b, . . . 14n numbers at least ten (10).

II. METHOD 44 OF ETCHING THE SUBSTRATE 14a

Figure 6:
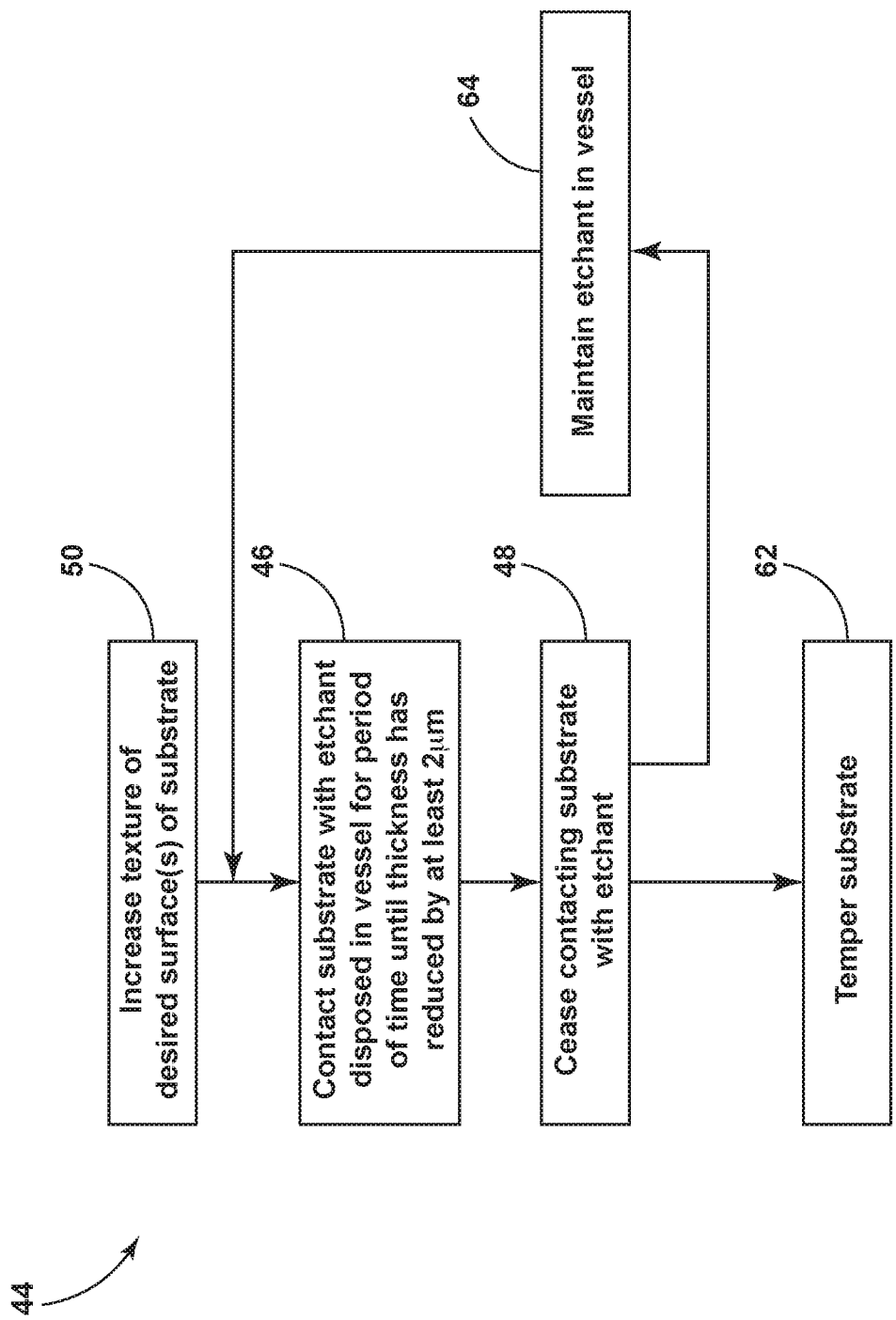
FIG. 6 is a flow chart of a method of etching the substrate of the system of FIG. 1, illustrating steps of contacting the substrate with the etchant and ceasing contacting the substrate with the etchant, as well as optional steps of texturing and tempering the substrate.
Figure 7:
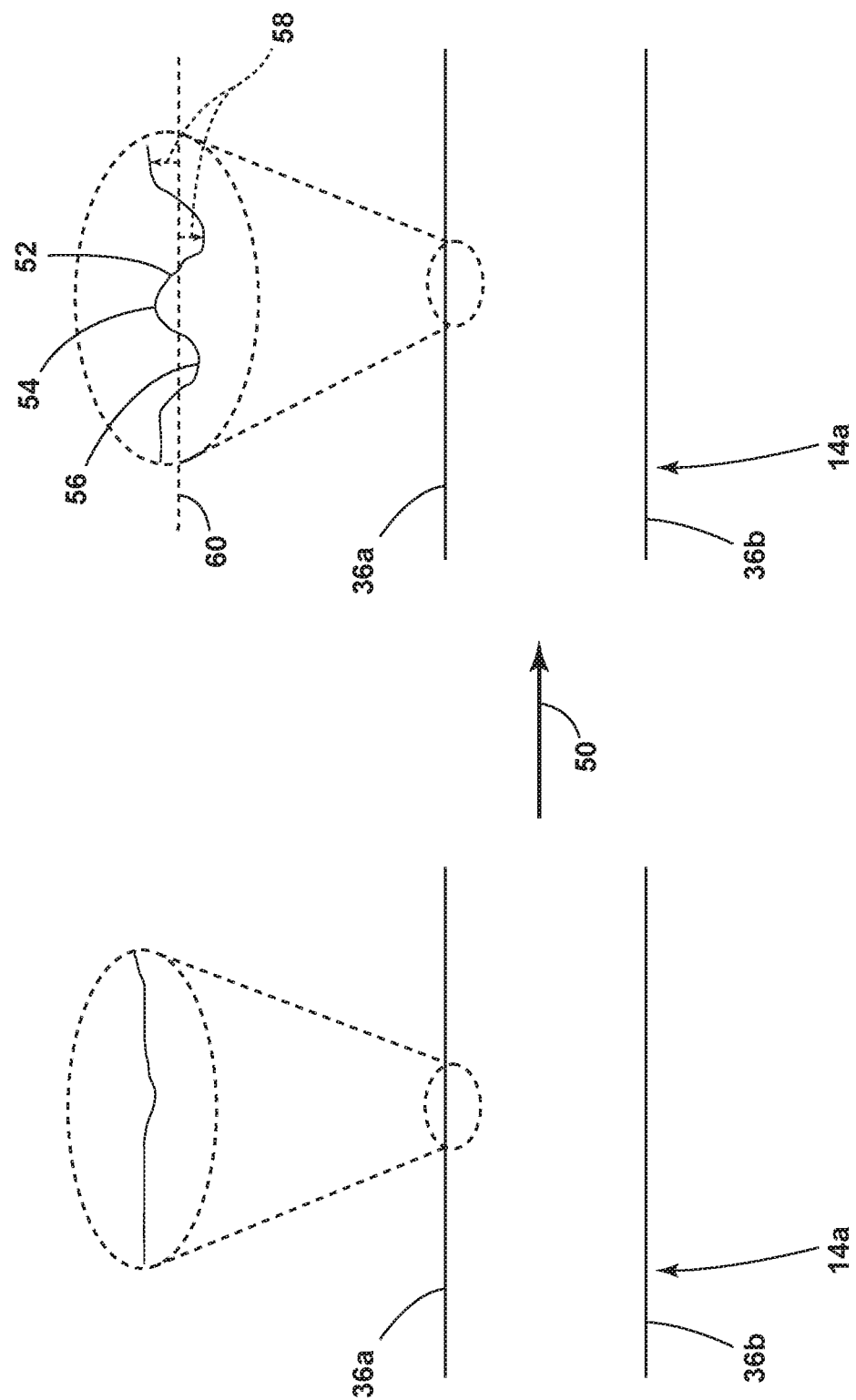
FIG. 7 is a schematic diagram of the optional texturing step of the method of FIG. 6, illustrating that the texturing step increases the prominence of surface features at the textured surfaces of the substrate of the system of FIG. 1.

Referring now to FIGS. 6 and 7, a method 44 of etching the substrate 14a is herein described. At a step 46, the method 44 includes contacting the substrate 14a with the etchant 18 disposed in the vessel 16 for a period of time until the thickness 12 has reduced by at least 2 μm. As discussed above, the etchant 18 has a temperature of 170° C. to 300° C., and comprises or is a molten mixture of two or more alkali hydroxides. To contact the substrate 14a with the etchant 18, the substrate 14a is moved from the first position 28 not contacting the etchant 18 to the second position 30 contacting the etchant 18. In embodiments, the etchant 18 is or comprises a molten mixture of NaOH and KOH. In embodiments, the etchant 18 comprises a molten mixture of 24 wt. % to 72 wt. % NaOH, and 76 wt. % to 28 wt. % KOH. As discussed above, the etchant 18 can further include one or more of an alkali nitrate (e.g., $KNO_3$, $NaNO_3$) and an alkali sulfate ($K_2SO_4$, $Na_2SO_4$). In embodiments, the one or more of the alkali nitrate and the alkali sulfate is greater than 0 wt. % to 95 wt. % of the etchant 18. The substrate 14a can be as described above, such as an alkali aluminosilicate glass substrate or an alkali aluminosilicate glass-ceramic substrate. The period of time can be as described above, such as between 5 minutes and 2 hours.

At a step 48, the method 44 further comprises ceasing contacting the substrate 14a with the etchant 18. That is, the substrate 14a is moved from the second position 30 to the third position 32. Ceasing contacting the substrate 14a with the etchant 18 stops the etchant 18 from reducing the thickness 12 of the substrate 14a. To cease the substrate 14a and the etchant 18 from contacting, the substrate 14a can be removed from the vessel 16 that contains the etchant 18 and subsequently rinsed with water, such as deionized water (such as 18.2 MΩ-cm resistance Type I water). As explained above, steps 46, 48 of the method 44 alter, by less than 5%, the weight percentage of any one or more of $Na^+$, $K^+$, $Li^+$ in the composition from the first surface 36a, the second surface 36b, or both the first surface 36a and the second surface 36b (depending on which surfaces contacted the etchant 18) to a depth of 1 μm into the thickness 12. In embodiments, steps 46, 48 of the method 44 alter the weight percentage of any one or more of $Na^+$, $K^+$, $Li^+$ in the composition by less than 1%. As explained above, steps 46, 48 of the method 44 alter, by less than 5%, the weight percentage of any one or more of $Ca^{++}$, $Mg^{++}$ in the composition from the first surface 36a, the second surface 36b, or both the first surface 36a and the second surface 36b (depending on which surfaces contacted the etchant 18) to a depth of 1 μm into the thickness 12. In embodiments, steps 46, 48 of the method 44 alter the weight percentage of any one or more of $Ca^{++}$, $Mg^{++}$ in the composition by less than 1%.

In embodiments, the method 44 further comprises increasing the texture of the first surface 36a, the second surface 36b, or both the first surface 36a and the second surface 36b of the substrate 14a, at a step 50. Step 50 occurs before step 46 of contacting the substrate 14a with the etchant 18. Texturing of the first surface 36a forms more pronounced surface features 52 at the first surface 36a that have peaks 54 and valleys 56. Various measurements of "surface roughness" can quantify the increase of the texture from step 50. For example, the arithmetical mean roughness value (Ra) is the arithmetical mean of the absolute values of deviations 58 from a mean line 60 of the measured roughness profile. The higher the Ra value, the greater the texture. Surface roughness quantifications are typically performed with an atomic force microscope, such as an atomic force microscope controlled by a NanoNavi control station distributed by Seiko Instruments Inc. (Chiba, Japan). In embodiments, the step 50 of increasing the texture of surfaces 36a, 36b comprises sandblasting the surfaces 36a, 36b. In sandblasting, sand is blasted over the surfaces 36a, 36b of the substrate 14a, and the diameter of the sand particles and air pressure of the blasting is controlled. For example, sandblasting can occur with 220 grit SiC particles having an average diameter of 63 μm at an air pressure of 60 psi. Other particles with differing sizes can be blasted at different air pressures.

In embodiments, the method 44 further comprises tempering the substrate 14a at a step 62. In embodiments, the step 62 of tempering the substrate 14a is performed after steps 46, 48 of contacting the substrate 14a with the etchant 18 and ceasing contacting the substrate 14a with the etchant 18. In other embodiments, the step 62 of tempering the substrate 14a is performed before step 46 of contacting the substrate 14a with the etchant 18. Tempering the substrate 14a, as described above, creates the region 38a contiguous with the first surface 36a and the region 38b contiguous with the second surface 36b that is under compressive stress ("CS"). The step 62 of tempering the substrate 14a can be performed via a thermal tempering process or a chemical tempering process, or both.

In embodiments, the step 62 of tempering is performed via an ion-exchange chemical tempering process. In ion-exchange, ions at or near the first and second surfaces 36a, 36b of the substrate 14a are replaced by—or exchanged with—larger ions usually having the same valence or oxidation state. In those embodiments in which the substrate 14a comprises, consists essentially of, or consists of an alkali aluminosilicate glass or glass-ceramic, an alkali borosilicate glass or glass-ceramic, an alkali aluminoborosilicate glass or glass-ceramic, or an alkali silicate glass or glass-ceramic, ions in the surface layer of the glass or glass-ceramic and the larger ions are monovalent alkali metal cations, such as $Na^+$ (when $Li^+$ is present in the glass), $K^+$, $Rb^+$, and $Cs^+$. Alternatively, monovalent cations in, at, or near the first and second surfaces 36a, 36b may be replaced with monovalent cations other than alkali metal cations, such as $Ag^+$ or the like.

In embodiments, the ion-exchange process is carried out by immersing the substrate 14a in a molten salt bath containing the larger ions to be exchanged with the smaller ions in the substrate 14a. It will be appreciated by those skilled in the art that parameters for the ion-exchange process, including, but not limited to, bath composition and temperature, immersion time, the number of immersions of the substrate 14a in a salt bath (or baths), use of multiple salt baths, and additional steps, such as annealing, washing, and the like, are generally determined by the composition of the substrate 14a and the desired depths of compression 40a, 40b and compressive stress of the substrate 14a that result from the tempering operation. By way of example, ion-exchange of alkali metal-containing glass or glass-ceramic substrates may be achieved by immersion in at least one molten bath containing a salt such as, but not limited to, nitrates, sulfates, and chlorides of the larger alkali metal ion. In embodiments, the molten salt bath comprises potassium nitrate (0-100 wt. %), sodium nitrate (0-100 wt. %), and lithium nitrate (0-12 wt. %), the combined potassium nitrate and sodium nitrate having a weight percentage within the range of 88 wt. % to 100 wt. %. In embodiments, the temperature of the molten salt bath typically is in a range from about 350° C. up to about 500° C., while immersion times range from about 15 minutes up to about 40 hours, including from about 20 minutes to about 10 hours. However, temperatures and immersion times different from those described above may also be used. The substrate 14a may be acid polished or otherwise treated to remove or reduce the effect of flaws at the first surface 36a and the second surface 36b that were introduced during the step 62.

In embodiments, the substrate 14a is one of a plurality of substrates 14a, 14b, . . . 14n, and each of the remaining substrates 14b . . . 14n of the plurality of substrates 14a, 14b, . . . 14n has a thickness 12. In such embodiments, the method 44 further comprises, at a step 64, maintaining the etchant 18 disposed in the vessel 16 and then sequentially repeating steps 46, 48 (and optionally steps 50, 62) for each remaining substrates 14b . . . 14n of the plurality of substrates 14a, 14b, . . . 14n. In other words, for each remaining substrate 14b, . . . 14n of the plurality of substrates 14a, 14b, . . . 14n, the method 44 further comprises performing: (a) step 46 of contacting the substrate 14n with the etchant 18 disposed in the vessel 16 for a period of time until the thickness 12 has reduced by at least 2 μm and at an average rate of 1 μm per minute to 6.7 μm per minute; and (b) step 48 of ceasing contacting the substrate 14n with the etchant 18. In embodiments, the period of time that the substrate 14n contacts the etchant 18 during step 46 is the same for each substrate 14n of the plurality of substrates 14a, 14b, . . . 14n. In embodiments, the plurality of substrates 14a, 14b, . . . 14n numbers at least 10. As mentioned above and further illustrated below, the etchant 18 has shown experimentally to be able to etch a relatively high number of the plurality of substrates 14a, 14b, . . . 14n in sequence at an acceptable rate.

In embodiments, each of the plurality of substrates 14a, 14b, . . . 14n was formed from the same batch composition, and thus each substrate 14n has approximately the same composition. In embodiments, the method 44 further comprises increasing the texture of a surface 36a, 36b of each remaining substrate 14n of the plurality of substrates 14a, 14b, . . . 14n—that is, performing step 50 for each remaining substrate 14b of the plurality of substrates 14a, 14b, . . . 14n. In embodiments, the method 44 further comprises tempering each remaining substrate 14n of the plurality of substrates 14a, 14b, . . . 14n—that is, performing step 62 for each remaining substrate 14n of the plurality of substrates 14a, 14b, . . . 14n.

III. EXAMPLES

Example 1

In Example 1, three 50 mm×50 mm samples (Samples 1-3) of a glass-ceramic substrate were prepared. The samples of the substrate 14a had a thickness 12a in the first position 28 (before step 46 of the method 44) as set forth in Table 1 below. The thickness 12 of the substrate 14a in the first position 28 was measured with a micrometer, and is represented below in Table 1 as the initial thickness 12a. The mass of each sample was measured with a balance, and represented below in Table 1 as the "initial mass." Then pursuant to step 46 of the method 44, the samples of the substrate 14a were each individually, in sequence, placed in the second position 30 in contact with an etchant 18. Both the first surface 36a and the second surface 36b of the samples of the substrate 14a contacted the etchant 18. The etchant 18 was a molten mixture of two alkali hydroxides. Specifically, the etchant 18 was a molten mixture of 43 wt. % NaOH and 57 wt. % KOH. This molten mixture had a melting point (becomes molten) at above about 175° C. Each of the three samples of the substrate 14a were contacted with the etchant 18 at different etchant 18 temperatures and for different periods of time: 10 minutes at 300° C. for Sample 1; 5 minutes at 245° C. for Sample 2; and 43 minutes at 225° C. for Sample 3. Then, pursuant to step 48 of the method 44, each sample was placed in the third position 32 to cease contacting the etchant 18. The mass of each sample was than measured with a balance, and represented below in Table 1 as the "final mass." The difference in the initial mass and the final mass (initial mass–final mass) is represented as "delta." The thickness 12b of each sample in the third position 32 (i.e., no longer contacting the etchant 18) was calculated as proportional to the change in mass pursuant to equations (1) and (2) above, and represented below in Table 1 as "final thickness 12b."

The differing combinations of the etchant 18 temperature and period of time that the substrate 14a contacted the etchant 18 resulted in the etchant 18 reducing the thickness 12 of the respective samples at different average etch rates: 2150.2 μm per hour (35.8 μm per minute) for Sample 1; 174.5 μm per hour (2.91 μm per minute) for Sample 2; and 75.0 μm per hour (1.25 μm per minute) for Sample 3. These etch rates were calculated pursuant to Equation (3) above. The results indicate that increased temperature provides an increased average etching rate. Sample 1, with the etchant 18 at 300° C., provided an etching rate of 35.8 μm per minute (i.e., over 0.5 μm per second), which is well over the maximum of about 6.7 μm per minute to consistently provide a substrate 14a with a predetermined thickness 12b at the third position 32 within acceptable tolerances. The temperatures of 245° C. for Sample 2, and 225° C. for Sample 3, resulted in manageable etch rates with the average rate range of 1 μm to 6.7 μm per minute (i.e., 60 μm per hour to 400 μm per hour), specifically 174.5 μm per hour (2.9 μm per minute) and 75.0 μm per hour (1.25 μm per minute) respectively. Table 1 below sets forth relevant data for all three samples.

TABLE 1

| Sample | initial mass (g) | final mass (g) | delta (g) | initial thickness 12a (μm) | final thickness 12b (μm) |
|---|---|---|---|---|---|
| 1 | 1.218 | 0.6811 | 0.5369 | 813 | 455 |
| 2 | 1.2692 | 1.2465 | 0.0227 | 813 | 798 |
| 3 | 1.231 | 1.1496 | 0.0814 | 813 | 759 |

TABLE 1-continued

| Sample | temperature (° C.) | Etch Time (min) | 2 side etch rate (μm/h) |
|---|---|---|---|
| 1 | 300 | 10 | 2150.2 |
| 2 | 245 | 5 | 174.5 |
| 3 | 225 | 43 | 75.0 |

Figure 8:
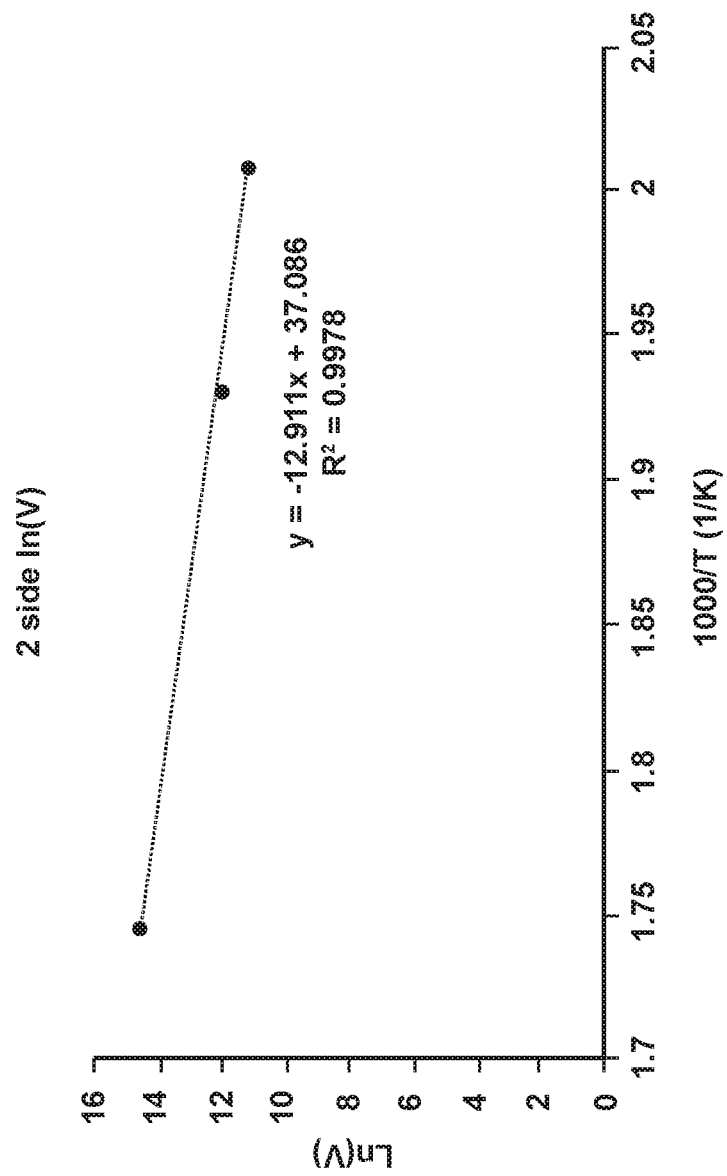
FIG. 8 is a graph pertaining to Example 1 of the disclosure, illustrating a linear trend line after plotting the natural log of the etching rate during the step of the method of FIG. 6 where the etchant of the system of FIG. 1 contacts the substrate as a function of the inverse of the temperature of the etchant (multiplied by 1000), according to the Arrhenius equation.

The etching of the three samples of the substrate 14a pursuant to the method 44 demonstrated, as alluded to above, a correlation between the temperature of the etchant 18 and the etch rate. As illustrated at FIG. 8, an Arrhenius plot was generated with the three data points of etch rate as a function of temperature of the etchant 18. The natural logarithm of the Arrhenius equation for purposes here can be described as ln $$V = \ln A \times C - \frac{E_a}{R} \frac{1}{T}.$$

In that equation, V is the etch rate (μm/hour); A is a constant; C is a concentration factor; $E_a$ is the activation energy (KJ/mol.); R is the universal gas constant; and T is the temperature (in K). The three data points allow for the generation of a linear trend line, from which an equation (set forth in FIG. 8) allowing for calculation of an average etch rate as a function of temperature is produced. From the trend line slope, $E_a$ is calculated here to be 107.3 KJ/mol., and A×C is $1.27*10^{13}$ μm/h.

Figure 9:
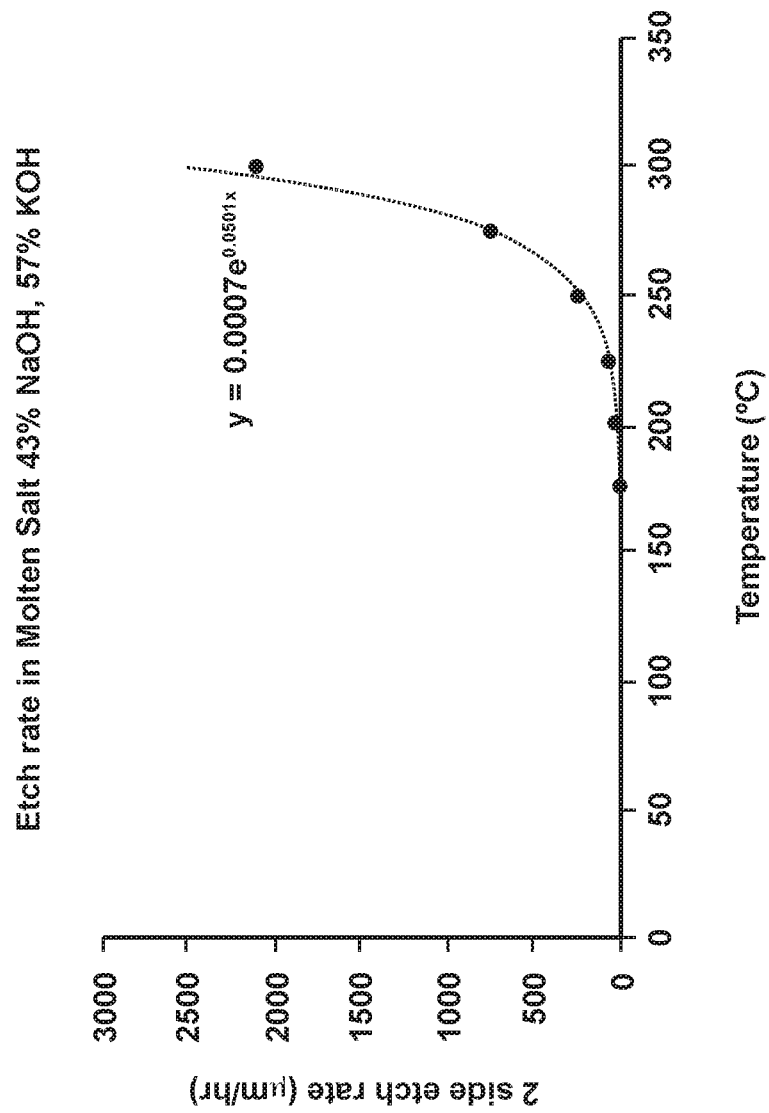
FIG. 9 is a graph pertaining to Example 1 of the disclosure, illustrating a graph of a calculated etching rate as a function of the temperature of the etchant pursuant to the equation generated from the trend line established by the graph of FIG. 8.

From the equation at FIG. 8, the resulting average etch rate for a variety of input temperatures is calculated. Those are set forth below in Table 2 and graphed in FIG. 9. As mentioned above, as the etchant 18 temperature begins to exceed 250° C. toward 275° C., the average etchant rate becomes too fast to manage to provide a thickness 12b in the third position 32 within repeatable tolerances. Table 2 below sets forth two-sided etch rate for various given temperatures of the etchant 18. The variation in etch rate as a function of temperature illustrates that, in embodiments, it is beneficial to maintain the temperature constant while the etchant 18 contacts the substrate 14a.

TABLE 2

| Etchant 18 Temperature (° C.) | Etch Rate (2 sided) (μm/h) |
|---|---|
| 175 | 4 |
| 200 | 18 |
| 225 | 70 |
| 250 | 243 |
| 275 | 748 |
| 300 | 2092 |

Figure 10:
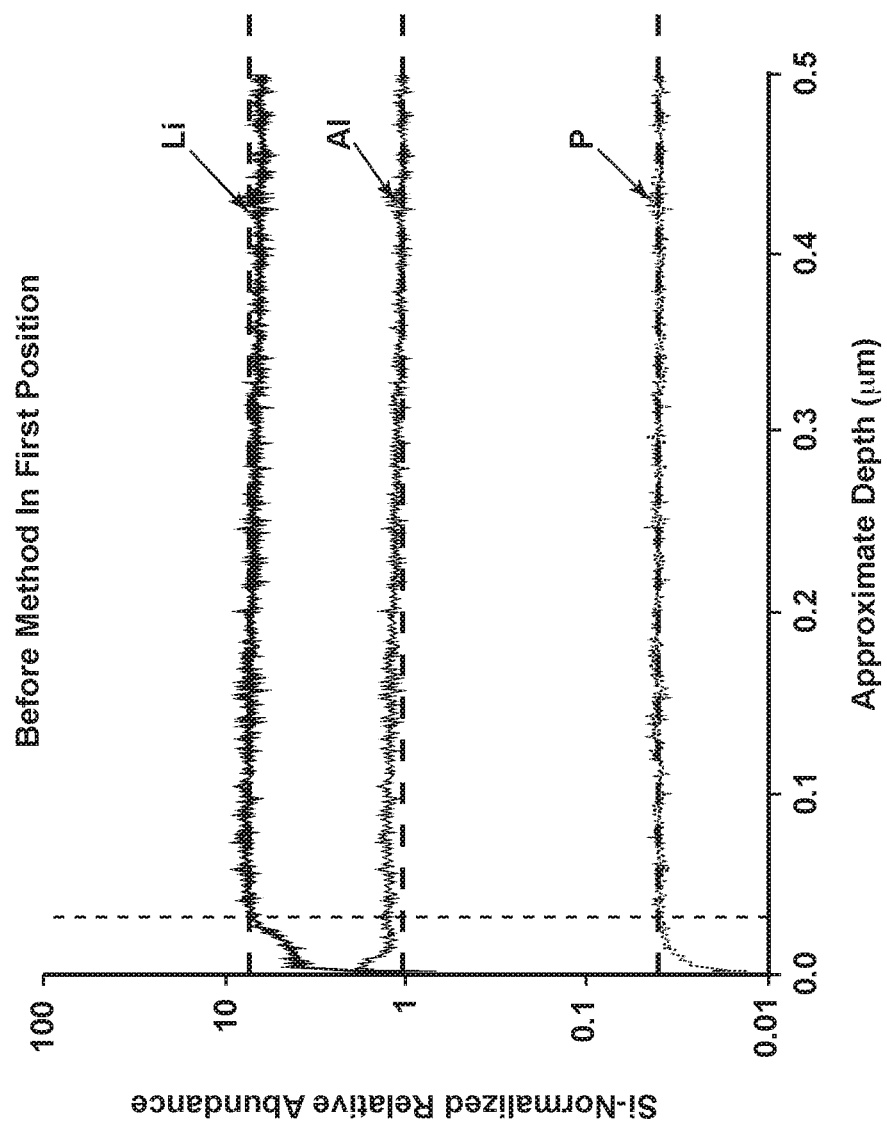
FIG. 10 is a graph pertaining to Example 1 of the disclosure, illustrating the silicon-normalized relative abundance of lithium, phosphorous, and aluminum in the substrate as a function of depth from the first surface in the first position before being subjected to the method of FIG. 6.
Figure 11:
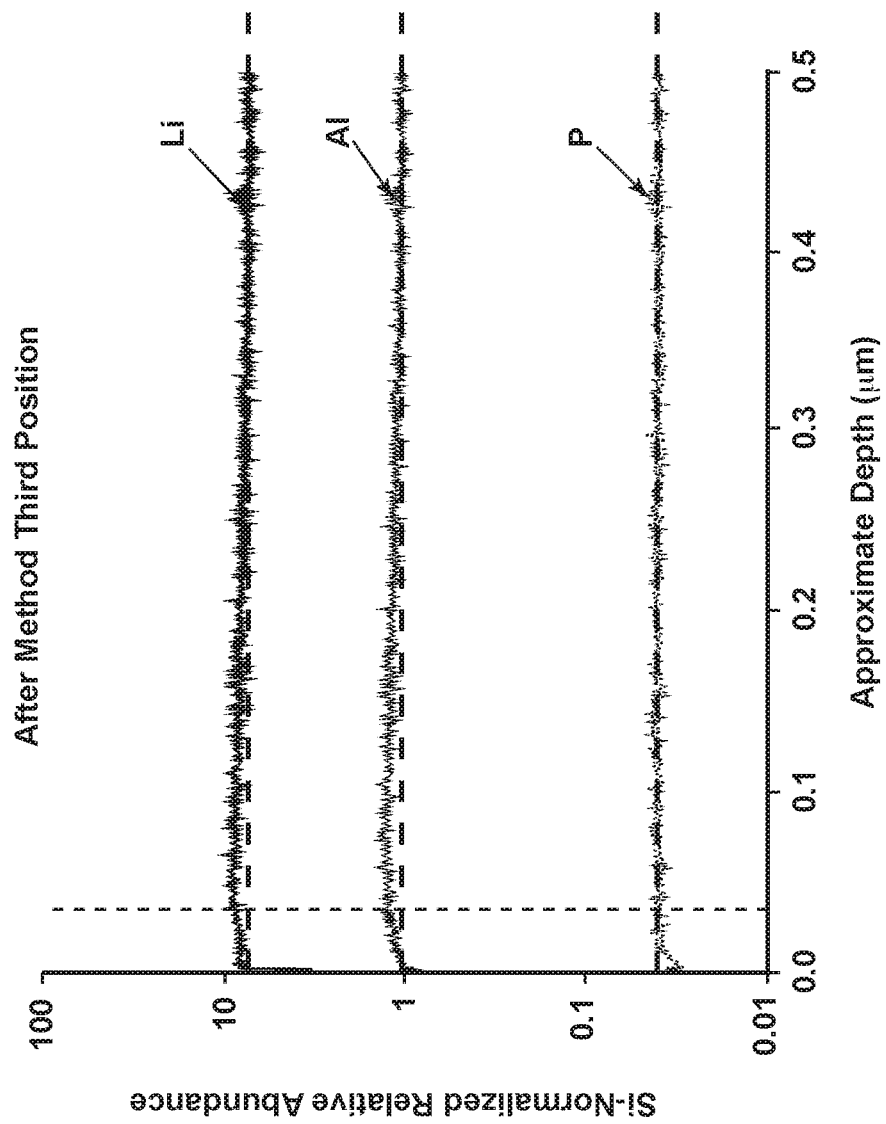
FIG. 11 is a graph pertaining to Example 1 of the disclosure, illustrating the silicon-normalized relative abundance of lithium, phosphorous, and aluminum in the substrate as a function of depth from the first surface in the third position, after being subjected to the steps of the method of FIG. 6 of contacting the substrate in the second position with the etchant and then ceasing such contact.

The glass-ceramic substrate of Sample 3 of this Example was tested, before being subjected to the method 44 (i.e., in the first position 28), to determine the silicon-normalized relative abundance of lithium, phosphorous, and aluminum in the composition of the substrate 14a as a function of depth from the first surface 36a to 500 nm (0.5 μm) into the thickness 12a. The results are as set forth in the graph of FIG. 10. After the thickness 12 of Sample 3 was reduced while in the second position 30 contacting the etchant 18 pursuant to step 46 of the method 44 and placed in the third position 32, Sample 3 was again tested to determine the silicon-normalized relative abundance of lithium, phosphorous, and aluminum in the substrate 14a as a function of depth from the first surface 36a to 500 nm (0.5 μm) into the thickness 12b. The results are as set forth in the graph of FIG. 11. A comparison of the graphs of FIGS. 10 and 11 reveal that the abundance of lithium in the composition of the substrate 14a before the method 44 (at the first position 28) and after the method 44 (at the third position 32) are substantially the same to a depth of 500 nm from the first surface 36a, especially after the composition of the substrate 14a normalizes after the first 30-40 nm into the thickness 12 of the substrate 14a. Secondary ion mass spectrometry (SIMS) was the technique utilized to determine the silicon-normalized relative abundance of lithium, phosphorous, and aluminum in the composition of the substrate 14a as a function of depth, as presented in the graphs of FIGS. 10 and 11.

Comparative Example 1

In Comparative Example 1, Samples 4-8 of the same glass-ceramic substrate used for Samples 1-3 in the above example were prepared. Instead of subjecting Samples 4-8 to steps 46 and 48 of the method 44, Samples 4-8 were contacted with an etchant of aqueous NaOH. Each of the Samples 4-8 were subjected to a different concentration of NaOH in the aqueous solution. The temperature of each aqueous solution of NaOH varied as a function of the concentration of NaOH in the aqueous solution. The higher the concentration of NaOH in the aqueous solution, the higher the temperature. The double-sided etch rate was determined for each of the Samples 4-8. The results are set forth below in Table 3.

TABLE 3

| Sample | NaOH (wt. %) | Temperature (° C.) | Etch Rate (μm/hr) |
|---|---|---|---|
| 4 | 10 | 101 | 0.50 |
| 5 | 20 | 107.1 | 0.85 |
| 6 | 30 | 116.7 | 1.94 |
| 7 | 40 | 128.8 | 4.22 |
| 8 | 50 | 132.5 | 5.51 |

As the above Table 3 reveals, the highest concentration of NaOH in the aqueous solution that was tested (Sample 8) provided the fastest etch rate of 5.51 μm per hour. That fastest etch rate is far below the manageable etch rates of 174.5 μm per hour and 75.0 μm per hour for Samples 2 and 3 respective of the Example above performing the method 44 and utilizing the molten mixture consisting of NaOH and KOH as the etchant 18. Even the slowest two-sided etch rate of 75.0 μm per hour for Sample 2 of the Example is over 13 times faster than the fastest two-sided etch rate of 5.51 μm per hour for Sample 8 of the Comparative Example 1. The fastest etch rate of 5.51 μm per hour (0.09 μm per minute) is far below the minimum of 1 μm per minute for two-sided etching pursuant to the method 44.

The temperature of an aqueous solution used as etchant is limited by the boiling point of the aqueous solution. In addition, the upper concentration limit for NaOH to be soluble in the aqueous solution is about 50 wt. % to 60 wt. %. Thus, the highest possible temperatures for aqueous solutions of NaOH is not much over 132.5° C. Samples 1-3 of the Example utilizing molten alkali salts allowed for much higher temperatures in the range of 225° C. to 300° C. The higher temperatures used for the Example over the Comparative Example helps explain the difference in the etch rates achievable for molten alkali salts as the etchant 18 versus an aqueous alkali solution as the etchant 18.

Example 2

In Example 2, 50 mm×50 mm samples 9-19 of the same glass-ceramic substrate used for Samples 1-8 in the above examples were prepared. A molten mixture of 43 wt. % NaOH and 57 wt. % KOH was prepared as the etchant 18. The molten mixture is eutectic. The etchant 18 was disposed in a vessel 16. The temperature of the etchant 18 was 222° C.

Pursuant to step 46 of the method 44, sample 9 was moved from the first position 28 to the second position 30 contacting the etchant 18. Sample 9 contacted the etchant 18 for a period of time until the thickness 12 was reduced by approximately 53 µm. Pursuant to step 48 of the method 44, sample 9 was then made to cease contacting the etchant 18. Pursuant to step 64 of the method 44, the etchant 18 was maintained disposed in the vessel 16.

Pursuant to step 64 of the method 44, the steps 46, 48 were successively repeated for each remaining Samples 10-19. The temperature of the etchant 18 was maintained approximately constant, with the range of 219.5° C. to 224° C. for each of the Samples 9-19. Each of the Samples 9-19 contacted the etchant 18 for the same time period.

Figure 12:
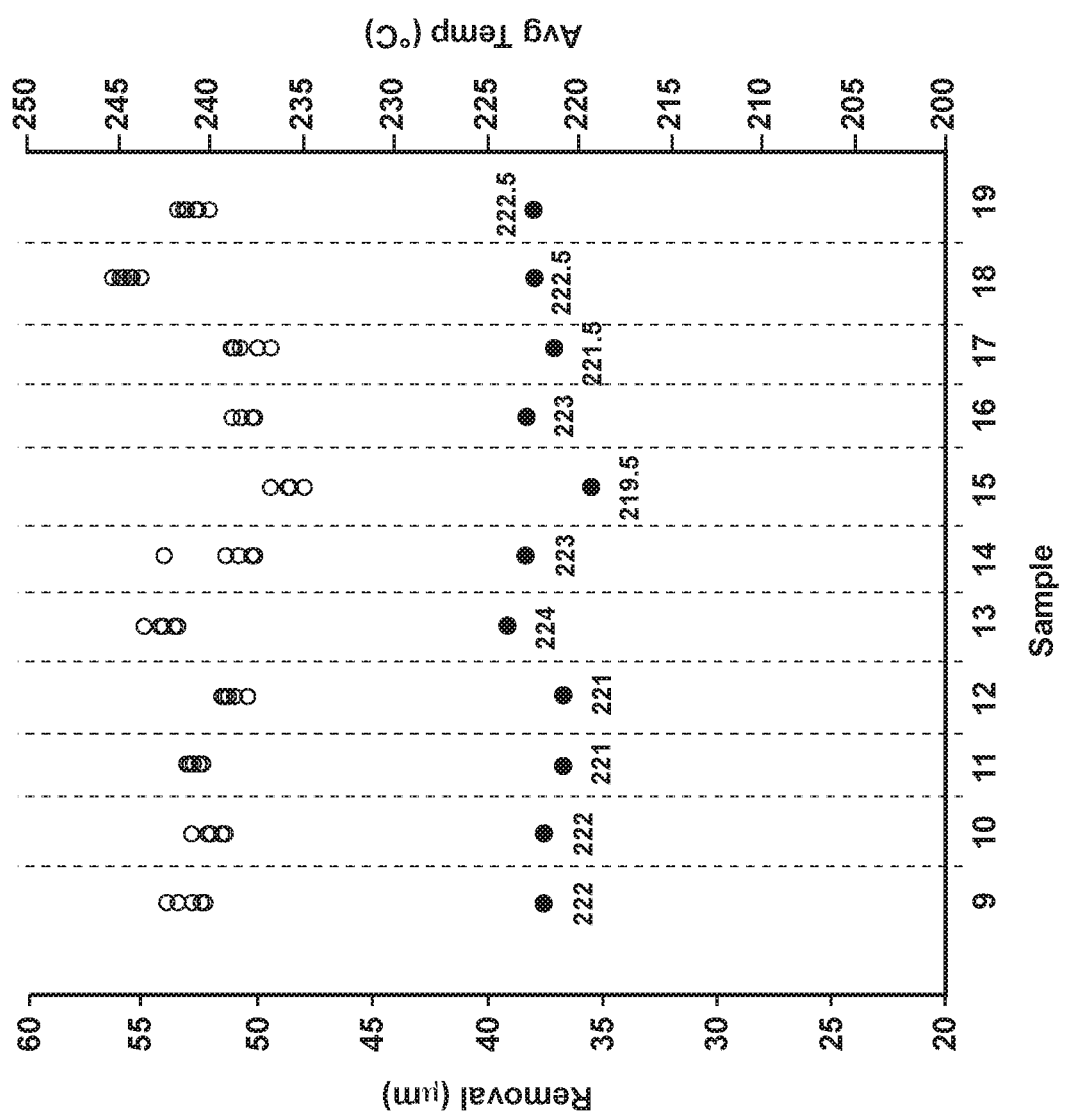
FIG. 12 is a graph pertaining to Example 2 of the disclosure, illustrating the decrease in the thickness of the substrate in the third position relative to the first position after contacting the etchant while in the second position pursuant to the method of FIG. 6 as well as the temperature of the etchant contacting the substrate, as a function of the particular sample of the example.

Referring now to the graph reproduced at FIG. 12, the difference between the thickness 12a, 12b of the sample in the first position 28 before step and in the third position 32 after steps 46, 48 due to contacting the etchant 18 in the second position 30 remained relatively constant for each of the Samples 9-19. The left axis ("removal") is the difference between the thickness 12a in the first position 28 and the thickness 12b in the third position 32 for each sample after contacting the etchant 18 in the second position 30. As mentioned, for Sample 9, the thickness 12b in the third position 32 after the method 44 was approximately 53 µm. For Sample 19, the thickness 12b in the third position 32 was also approximately 53 µm—the same as Sample 9. In other words, the etchant 18 was capable of etching at approximately the same etch rate for all Samples 9-19, with no observable drop in etch rate from Sample 9 to Sample 19, despite etching Samples 10-18 in between. The etchant 18 had a clarity that remained the same after etching Samples 9-19. The etchant 18 had a color that gradually changed from colorless before etching Sample 9 to blue-green after etching Sample 19. The change in color is likely due to the transfer of zinc from the substrate 14a of Samples 9-19 to the etchant 18.

Example 3

In Example 3, Samples 20-22 of the same glass-ceramic substrate used for Samples 1-19 in the above examples were prepared. Each of the Samples 20-22 were textured via sandblasting pursuant to step 50 of the method 44. Sample 20 was not subjected to etching via step 50 or otherwise or tempering by ion-exchange via step 62. Sample 21 was etched for 35 minutes in a molten salt bath of 43 wt. % NaOH and 57 wt. % KOH at 225° C. pursuant to step 62 of the method 44. Sample 23 was etched in an aqueous solution of 50 wt. % NaOH at 130° C. for 7.3 hours rather than in a molten salt bath pursuant to step 46 of the method 44. The final thickness 12b is measured herein using a micrometer, specifically a 293-242 micrometer distributed by Mitutoyo Corporation (Kawasaki, Japan).

TABLE 4

| Sample | Step _ (sand-blast) | Step _ (IOX) | Etching Criteria | Etch Removal (µm) (two-sided) | Final Thickness 12b (µm) |
|---|---|---|---|---|---|
| 20 | Yes | No | NA | NA | |
| 21 | Yes | Yes | Step _, 35 min. @ 225° C. | 20 | 600 |
| 22 | Yes | Yes | Aqueous 50 wt. % NaOH, 130° C., 7.3 hrs. | 20 | 600 |

| Sample | Rq (nm) | Ra (nm) | T-Haze (%) | Transmittance (%) | Gloss-60 (%) |
|---|---|---|---|---|---|
| 20 | 640 | 492 | 73.1 | 88.3 | 2.2 |
| 21 | 823 ± 17 | 629 ± 27 | 67.6 | 92.2 | 12.9 |
| 22 | 794 ± 25 | 612 ± 17 | 68.1 | 91.6 | 12.8 |

Various properties of the Samples 20-22 were then measured. Specifically, surface roughness was measured in terms of RMS Roughness (Rq) and Roughness Average (Ra), mentioned above. RMS Roughness (Rq) is the root mean square average of the profile heights over the evaluation length. These roughness values were measured using an atomic force microscope, specifically an atomic force microscope controlled by a NanoNavi control station distributed by Seiko Instruments Inc. (Chiba, Japan). Transmission haze ("T-Haze") refers to the percentage of transmitted light scattered outside an angular cone of ±4.0° according to The American Society for Testing and Materials (ASTM) D1003. A Haze-Guard haze testing apparatus (Elektron Technologies, PLC) was utilized to measure haze values. For an optically smooth surface, the transmission haze is generally close to zero. Haze values are usually reported in terms of percent haze. "Transmittance" refers to the percentage of incident optical power throughout the visible wavelength range transmitted through the samples, in accordance with ASTM D1003. Transmittance values herein were measured using the Haze-Guard testing apparatus by Elektron Technologies, PLC, mentioned above. Transmittance is reported as percentages (%). "Gloss" refers to the measurement of specular reflectance calibrated to a standard (such as, for example, a certified black glass standard) in accordance with ASTM procedure D523, the contents of which are incorporated herein by reference in their entirety. Gloss herein is measured using a geniophotometer, such as that available from Rhopoint Instruments mentioned above. Common gloss measurements are typically performed at incident light angles of 20°, 60°, and 85°, with the most commonly used gloss measurement being performed at 60° ("Gloss-60" refers to this incident light angle measurement).

TABLE 4-continued

| Sample | Rq (nm) | Ra (nm) | T-Haze (%) | Transmittance (%) | Gloss-60 (%) |
|---|---|---|---|---|---|
| 20 | 640 | 492 | 73.1 | 88.3 | 2.2 |
| 21 | 823 ± 17 | 629 ± 27 | 67.6 | 92.2 | 12.9 |
| 22 | 794 ± 25 | 612 ± 17 | 68.1 | 91.6 | 12.8 |

Sample 21 etched pursuant to step 46 of the method 44 with the molten alkali salt results in similar haze, transmittance, and gloss values as Sample 22 etched not pursuant to the method 44 and with an aqueous alkali solution. However, etching Sample 21 via step 46 of the method 44 took 35 minutes whereas etching Sample 22 using an aqueous alkali solution required 7.3 hours. In other words, Sample 21 achieved similar haze, transmittance, and gloss values as Sample 22 but required less than 10 percent of the time to etch. Both etching processes resulted in an increase in measured surface roughness values over Sample 20.

Example 4

In Example 4, Samples 23-26 of the same glass-ceramic substrate used for Samples 1-22 in the above examples were prepared. All Samples 23-26 were tempered at step 62 of the method 44 via ion-exchange. Sample 23 was not textured via sandblasting or etched by any process. Sample 24 was not textured via step 50 but was etched pursuant to steps 46, 48 of the method 44 for 35 minutes in the molten salt bath of 43 wt. % NaOH and 57 wt. % KOH at 225° C. Sample 25 was both textured via step 50 and etched pursuant to steps 46, 48 of the method 44 for 35 minutes in the molten salt bath of 43 wt. % NaOH and 57 wt. % KOH at 225° C. Sample 26 was textured via step 50 but then etched for 7.3 hours in an aqueous solution of 50 wt. % NaOH at 130° C. rather. Samples 24-26 were all etched at both main surfaces to remove 20 μm.

TABLE 5

| Sample | Sandblast | Etch |
|---|---|---|
| 23 | No | No |
| 24 | No | Yes (Step 46) |
| 25 | Yes | Yes (Step 46) |
| 26 | Yes | Yes (aqueous) |

Figure 13:
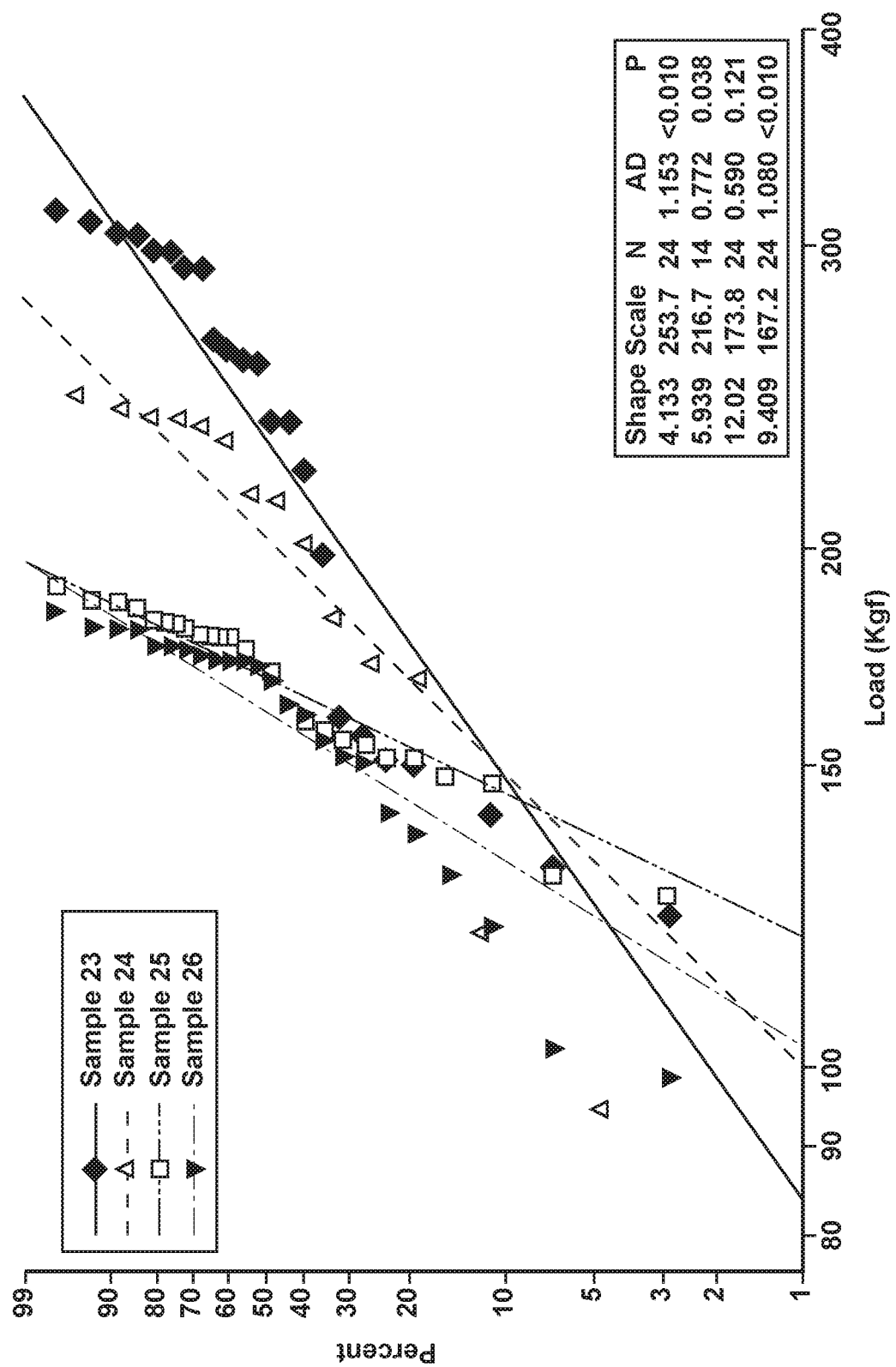
FIG. 13 is a Weibull graph pertaining to Example 4 of the disclosure, illustrating the percent likelihood of fracture of the substrate as a function of a ring-on-ring load on the substrate, for substrates that underwent different steps of the method of FIG. 6 utilizing a molten eutectic mixture of NaOH and KOH in comparison to substrates that were etched via an aqueous solution.

Referring now to FIG. 13, each of the Samples 23-26 were then subjected to ring-on-ring load to failure testing according to ASTM C1499. The ring-on-ring load to failure testing is one way to determine the surface strength of the first surface 36a of the substrate 14a. The first surface 36a was placed downward on the ring. The testing was performed with an Instron 5967 Universal Test Machine. FIG. 13 is a Weibull probability graph showing the likelihood of fracture of the substrate 14a as a function of the load on the substrate 14a. Note that Sample 25 that was etched pursuant to the method 44 is slightly stronger than Sample 26 that was etched in an aqueous NaOH solution. In addition, Sample 24 that was etched pursuant to the method 44 has similar strength as Sample 23 that was not etched in any manner.

It will be apparent to those skilled in the art that various modifications and variations can be made without departing from the spirit or scope of the claims.

What is claimed is:

1. A method of etching a substrate comprising:
contacting a substrate having a thickness with an etchant disposed in a vessel for a period of time until the thickness has reduced by at least 2 μm and at an average rate of 1 μm per minute to 6.7 μm per minute, the etchant having a temperature of 170° C. to 300° C. and comprising a molten mixture of two or more alkali hydroxides, wherein the substrate is being etched away faster than ion-exchange between the etchant and the substrate; and
ceasing contacting the substrate with the etchant.

2. The method of claim 1 further comprising:
before contacting the substrate with the etchant, increasing a texture of a surface of the substrate.

3. The method of claim 1 further comprising:
after ceasing contacting the substrate with the etchant, subjecting the substrate to an ion-exchange procedure.

4. The method of claim 1, wherein
the etchant further comprises one or more of an alkali nitrate and an alkali sulfate.

5. The method of claim 1, wherein the molten mixture of the etchant comprises NaOH and KOH.

6. The method of claim 1, wherein
the substrate is an alkali aluminosilicate glass substrate or an alkali aluminosilicate glass-ceramic substrate.

7. The method of claim 1, wherein
the period of time is between 5 minutes and 2 hours.

8. The method of claim 1, wherein
the substrate has a composition; and
the method alters a weight percentage of any one or more of $Na^+$, $K^+$, $Li^+$ in the composition from a surface to a depth of 1 μm into the thickness by less than 5%.

9. The method of claim 1, wherein
the substrate has a composition; and
the method alters a weight percentage of any one or more of $Ca^{++}$, $Mg^{++}$ in the composition from a surface to a depth of 1 μm into the thickness by less than 5%.

10. The method of claim 1, wherein the substrate is one of a plurality of substrates, each having a thickness, and, the method further comprises:
maintaining the etchant disposed in the vessel; and
for each remaining substrate of the plurality of substrates sequentially:
(a) contacting the substrate with the etchant disposed in the vessel for a period of time until the thickness has reduced by at least 2 μm and at an average rate of 1 μm per minute to 6.7 μm per minute; and
(b) ceasing contacting the substrate with the etchant.

11. The method of claim 10, wherein
the plurality of substrates numbers at least 10 substrates; and
each of the plurality of substrates was formed from the same batch composition.

12. The method of claim 10 further comprising:
before contacting each remaining substrate of the plurality of substrates, increasing a texture of a surface of each remaining substrate of the plurality of substrates; and
tempering each remaining substrate of the plurality of substrates via an ion-exchange procedure.

13. The method of claim 1, wherein
the molten mixture of the etchant comprises 24 wt. % to 72 wt. % NaOH, and 76 wt. % to 28 wt. % KOH.

14. The method of claim 1, wherein
the molten mixture of the etchant is or comprises a eutectic molten mixture of the two or more alkali hydroxides.

15. The method of claim 1, wherein
the molten mixture of the etchant is or comprises a eutectic molten mixture of NaOH and KOH.

* * * * *